US008139114B2

United States Patent
Nobori et al.

(10) Patent No.: US 8,139,114 B2
(45) Date of Patent: Mar. 20, 2012

(54) SURROUNDINGS MONITORING APPARATUS AND SURROUNDINGS MONITORING METHOD FOR REDUCING DISTORTION CAUSED BY CAMERA POSITION DISPLACEMENT

(75) Inventors: Kunio Nobori, Osaka (JP); Masaki Sato, Kanagawa (JP)

(73) Assignee: Panasonic Corporation, Osaka (JP)

( * ) Notice: Subject to any disclaimer, the term of this patent is extended or adjusted under 35 U.S.C. 154(b) by 1537 days.

(21) Appl. No.: 11/541,684

(22) Filed: Oct. 3, 2006

(65) Prior Publication Data

US 2007/0041659 A1 Feb. 22, 2007

Related U.S. Application Data

(63) Continuation of application No. PCT/JP2006/302478, filed on Feb. 13, 2006.

(30) Foreign Application Priority Data

Feb. 15, 2005 (JP) ................................. 2005-038295

(51) Int. Cl.
  *H04N 7/18* (2006.01)
(52) U.S. Cl. ........................................ 348/148
(58) Field of Classification Search .................. 348/148, 348/222.1, 333.01, 373
  See application file for complete search history.

(56) References Cited

U.S. PATENT DOCUMENTS

| 7,307,655 B1 * | 12/2007 | Okamoto et al. .......... 348/222.1 |
| 2004/0021786 A1 | 2/2004 | Nakamura et al. | |

FOREIGN PATENT DOCUMENTS

| EP | 1 038 734 | | 9/2000 |
|---|---|---|---|
| EP | 1 115 250 | | 7/2001 |
| EP | 1 179 958 | | 2/2002 |
| JP | 58-110334 | | 6/1983 |
| JP | 11-078692 | | 3/1999 |
| JP | 2000-229547 | | 8/2000 |
| JP | 2002-135765 | | 5/2002 |
| JP | 2003-346189 | | 12/2003 |
| JP | 2004-064705 | | 2/2004 |
| JP | 2004-258266 | | 9/2004 |
| WO | 00/07373 | | 2/2000 |
| WO | WO00/07373 | * | 2/2000 |
| WO | 00/64175 | | 10/2000 |

* cited by examiner

*Primary Examiner* — Jay Au Patel
*Assistant Examiner* — James Pontius
(74) *Attorney, Agent, or Firm* — Wenderoth Lind & Ponack, L.L.P.

(57) ABSTRACT

A surrounding monitoring apparatus reduces distortion caused by camera position displacement. A position displacement information obtainment unit obtains position displacement information and outputs it as camera position displacement information, a moving object state detection unit detects vehicle information and outputs it as a moving object state, a coordinate transformation parameter selection unit selects a coordinate transformation parameter according to the camera position displacement information, an image synthesis parameter selection unit selects a reference image synthesis parameter and a graphics parameter according to the moving object state, a coordinate transformation unit performs coordinate transformation on image coordinates of a captured image which are included in the reference image synthesis parameter using the coordinate transformation parameter and outputs the image coordinates as a transformed image synthesis parameter, and an image synthesis unit generates and outputs a synthetic image according to the transformed image synthesis parameter.

20 Claims, 27 Drawing Sheets

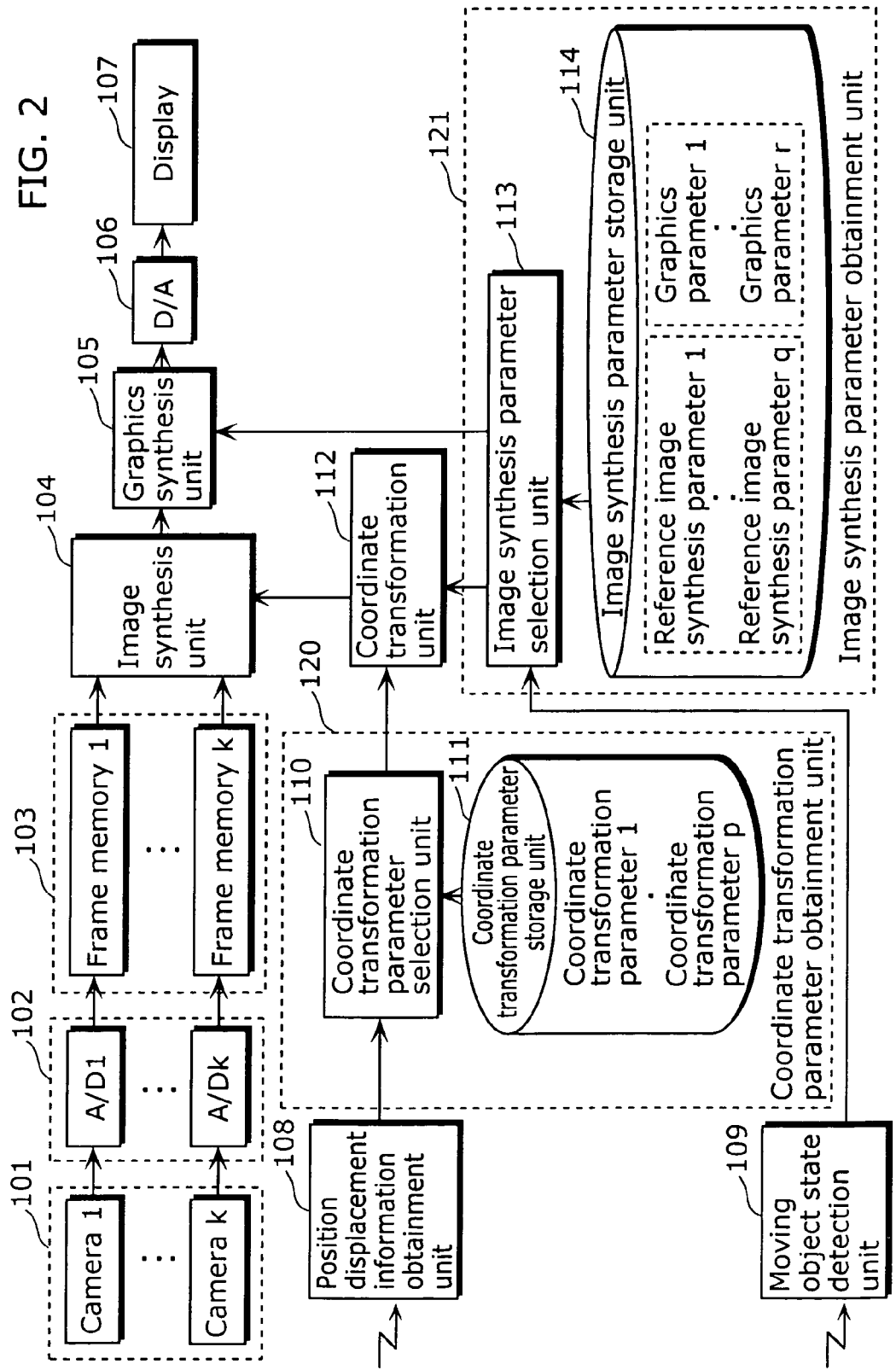

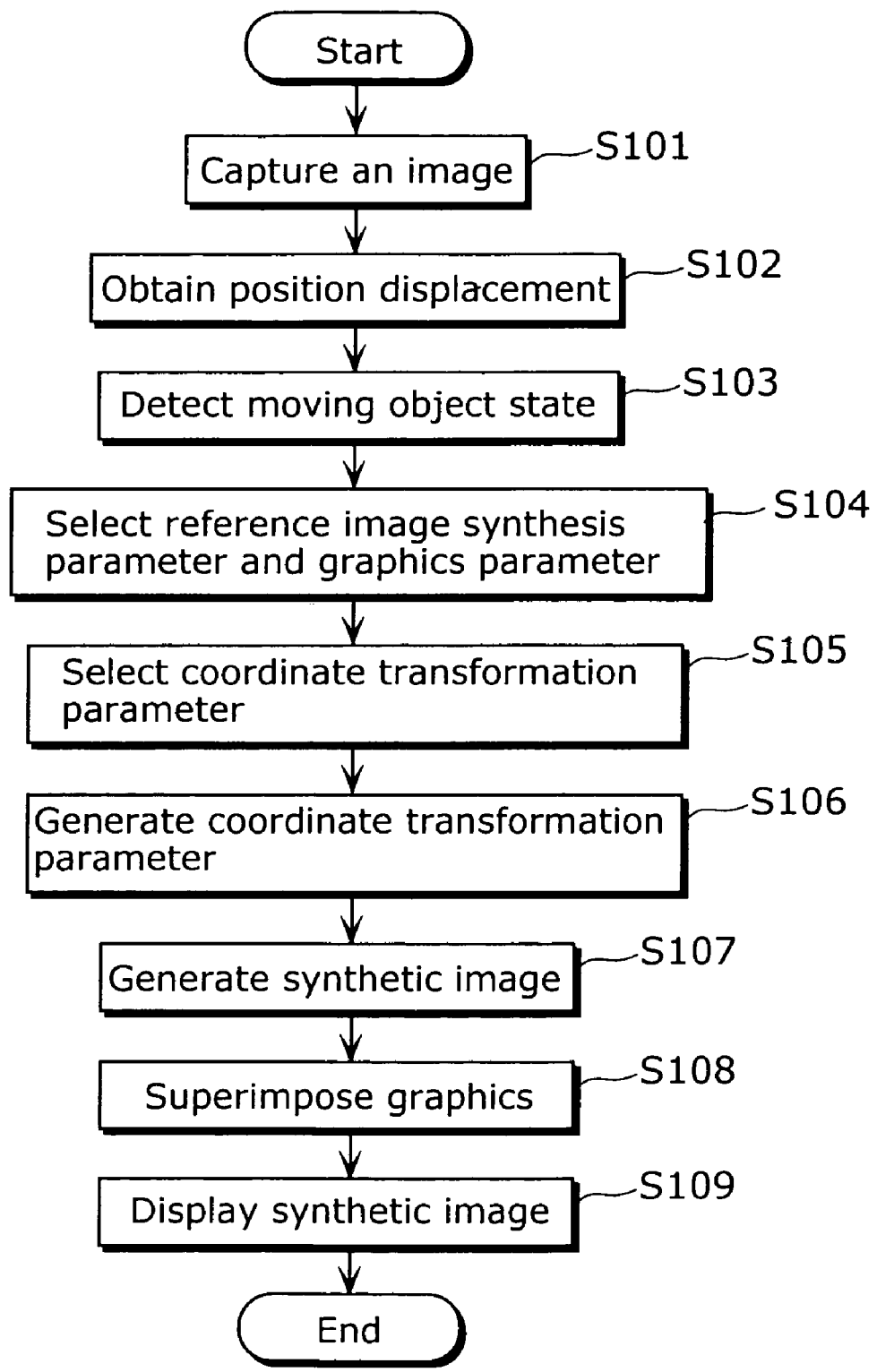

| Input | | | Output | |
|---|---|---|---|---|
| Vehicle speed | Shift lever | Steering angle | Reference image synthesis parameter | Graphics parameter |
| Stop | R | — | 1 | 1 |
| Move | R | Right | 2 | 2-1 |
| | | Neutral | 2 | 2-2 |
| | | Left | 2 | 2-3 |
| | Other than R | — | 3 | 3 |

FIG. 12

| Number k | Position displacement E | Coordinate transformation parameter P (E, k) | | | | | | | |
|---|---|---|---|---|---|---|---|---|---|
| | ewy | a, | b, | c, | d, | e, | f, | g, | h |
| | ⋮ | | | | | ⋮ | | | |
| 1 | -5 | 1.34, | 0.07, | -81.8, | 0.06, | 1.18, | -20.0, | 0.00053, | 0.000015 |
| | -4 | 1.26, | 0.05, | -63.1, | 0.05, | 1.13, | -15.4, | 0.00041, | 0.000009 |
| | -3 | 1.19, | 0.04, | -45.8, | 0.03, | 1.10, | -11.1, | 0.00030, | 0.000005 |
| | -2 | 1.12, | 0.02, | -29.5, | 0.02, | 1.06, | -7.09, | 0.00019, | 0.000002 |
| | -1 | 1.06, | 0.01, | -14.3, | 0.01, | 1.03, | -3.41, | 0.00009, | 0.000001 |
| | 0 | 1.00, | 0.00, | 0.00, | 0.00, | 1.00, | 0.00, | 0.00000, | 0.000000 |
| | 1 | 0.94, | -0.01, | 13.5, | -0.01, | 0.97, | 3.18, | -0.00009, | 0.000001 |
| | 2 | 0.89, | -0.02, | 26.2, | -0.02, | 0.95, | 6.14, | -0.00017, | 0.000002 |
| | 3 | 0.84, | -0.03, | 38.2, | -0.03, | 0.92, | 8.90, | -0.00025, | 0.000003 |
| | 4 | 0.79, | -0.04, | 49.6, | -0.04, | 0.90, | 11.5, | -0.00032, | 0.000007 |
| | 5 | 0.75, | -0.05, | 60.4, | -0.05, | 0.88, | 13.9, | -0.00039, | 0.000011 |
| ⋮ | ⋮ | | | | | ⋮ | | | |

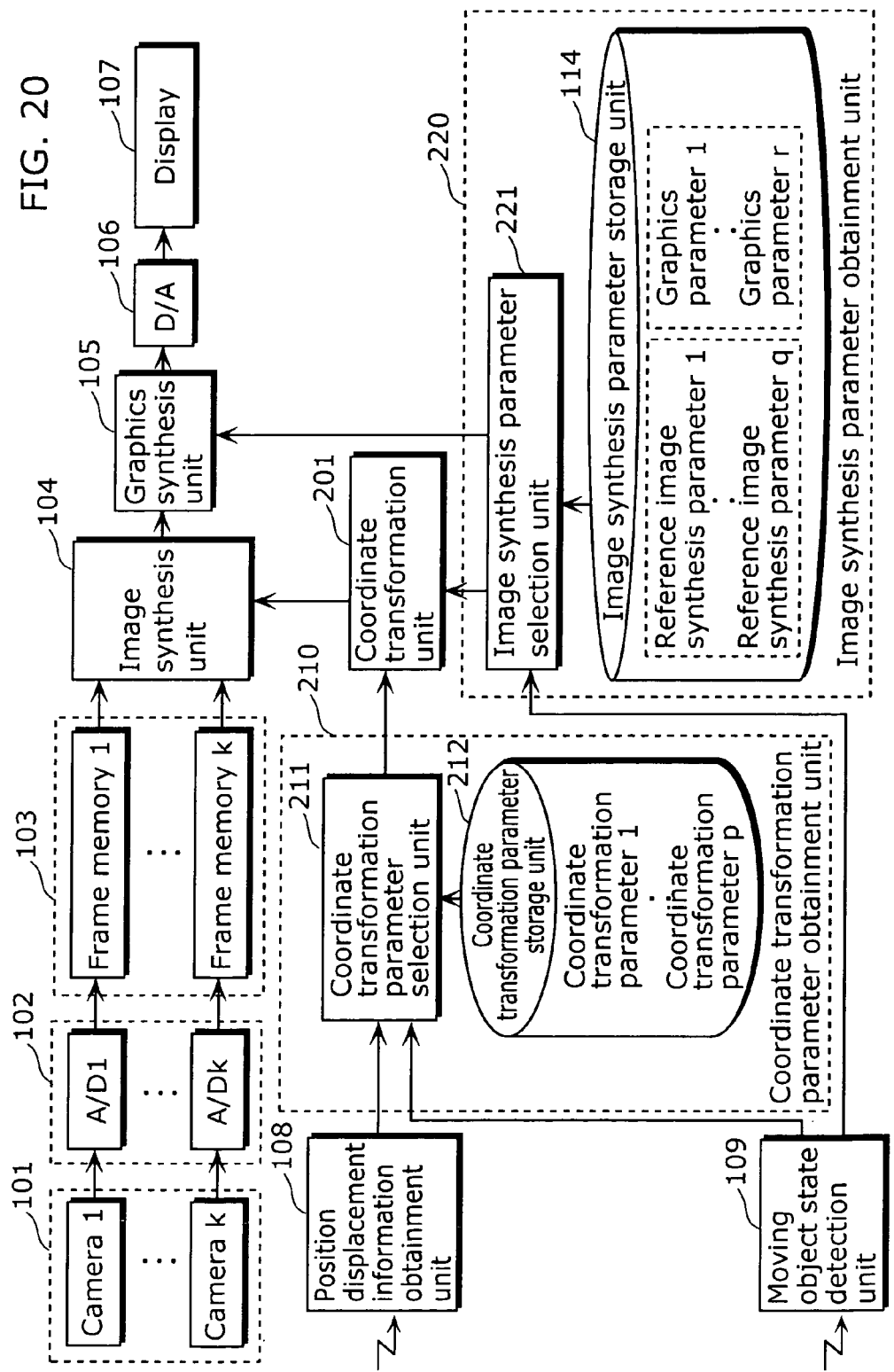

SURROUNDINGS MONITORING APPARATUS AND SURROUNDINGS MONITORING METHOD FOR REDUCING DISTORTION CAUSED BY CAMERA POSITION DISPLACEMENT

CROSS REFERENCE TO RELATED APPLICATION

This is a continuation application of PCT application No. PCT/JP2006/302478 filed Feb. 13, 2006 designating the United States of America.

BACKGROUND OF THE INVENTION (1) Field of the Invention

The present invention relates to a surroundings monitoring apparatus which generates a synthetic image of the vehicle surroundings using an image captured by a camera.

(2) Description of the Related Art

Conventionally, there are surroundings monitoring apparatuses using image synthesis technology, which generate a synthetic image by deforming an image captured by a camera as if it were taken from a virtual viewpoint, and a synthetic image by synthesizing images captured by a plurality of cameras.

As an example of such a surroundings monitoring apparatus, a surroundings monitoring apparatus is disclosed which captures images of the surroundings of a vehicle by a plurality of cameras and deforms the captured images so as to generate the image seen from above the surroundings of the vehicle (for example, refer to Patent Documents 1 to 3).

FIG. 1A is a block diagram of the conventional surroundings monitoring apparatus, and FIG. 1B shows an example of a synthetic image, which are described in Patent Document 2. In the conventional surroundings monitoring apparatus shown in FIG. 1A, image memories 7-1 to 7-8 temporarily store images captured by the cameras 3-1 to 3-8 at a timing controlled by the timing generator 9 and transmitted to the image memories 7-1 to 7-8 after being converted by the A/D converters 5-1 to 5-8. A combination of an address counter 13-1, a vertical address look-up table (LUT) 13-2, a horizontal address LUT 13-3, and a memory selector LUT 13-4 in the video deforming and synthesizing unit 13 generate the image coordinates for the captured image which correspond to each pixel of the synthetic image, in other words, an address in each of the image memories 7-1 to 7-8. Then, a memory selector 13-5 reads the image in the image memories. Using this surroundings monitoring apparatus, it is possible to generate a synthetic image from the images captured by a plurality of cameras 3-1 to 3-8, as if it were taken from above the vehicle as shown in FIG. 1B, and display the generated synthetic image on a monitor 17, 17-1 after being converted by the D/A converter 13-6. In the case where the surroundings of the vehicle is monitored using such a surroundings monitoring apparatus, it is possible to check, on a screen, a blind spot area which can not be directly seen from a driving seat. Thus, there are advantages, such as avoiding a collision with surrounding objects and facilitating driving operation. In particular, the surroundings monitoring apparatus including the aforementioned look-up tables can generate images by calculating a correspondence between a captured image and a synthetic image in the coordinates beforehand, storing the results in the look-up tables, and referring to the look-up tables in execution. Therefore, there is an advantage that the calculation load in execution is small.

However, in the conventional configuration, in the case where an error occurs between the position of a camera installed in a vehicle and a designed value after creating look-up tables based on the camera installation position in design, or in the case where the position of the camera installed in the vehicle or a location of the vehicle is displaced after creating look-up tables based on the position of the camera measured after installing the camera in the vehicle, the captured image in which the position of the camera (including the direction) is displaced from the position of the camera at the time of creating the look-up tables is inputted. As a result, there is a problem that the resulting synthetic image is distorted. For example, the positions of the surrounding objects in the synthetic image, such as a road surface and other vehicles are displaced with respect to the synthetic image at the time of creating the look-up tables, and the joining areas of the images captured by the cameras which are in the synthetic image become discontinuous. In particular, in the case where graphics which show a reference position relative to the vehicle or a reference distance to the vehicle are superimposed on the synthetic image in which the positions of the surrounding objects are displaced from the actual positions, the superimposing is not preferable because the position relationship between the surrounding objects and the vehicle may be misunderstood. For the description hereinafter, a camera position at the time of creating a look-up table is referred to as a "reference camera position", an image synthesis parameter such as a look-up table generated with respect to the reference camera position is referred to as a "reference image synthesis parameter", and an image which is generated using an image captured in the reference camera position and the reference image synthesis parameter is referred to as a "reference synthetic image".

As a method for correcting the distortions in the synthetic image caused by such position displacement of the camera, a method called the camera calibration method is known which measures an inner parameter, a camera position after installing the camera or the like (for example, refer to Non-patent Document 1).

Even in the case where the camera installation position is displaced, the use of this camera calibration method makes it possible to generate images with almost no position displacement with respect to the reference synthetic image, by measuring a position where the camera is installed and recalculating the look-up tables.

Patent Document 1: Japanese Laid-Open Patent Application No. 58-110334

Patent Document 2: Japanese Laid-Open Patent Application No. 11-78692

Patent Document 3: Japanese Patent No. 3286306 Publication

Non-patent Document 1: "An Efficient and Accurate Camera Calibration Technique for 3D Machine Vision", Roger Y. Tsai, Proceedings of IEEE Conference on Computer Vision and Pattern Recognition, Miami Beach, Fla., 1986, pages 364-374.

However, for camera calibration, there exists another problem in that a photographic subject with a known size is required and the calculation load for calculating a position of a camera and for recalculating a look-up table is heavy.

For example, when cameras are installed on vehicles in an assembly plant of the vehicles, even in the case where vehicles to be assembled are the same model, the height or inclination of the vehicles varies depending on differences in the weight of the vehicles with and without optional equipment and differences in the tire size of the vehicles. Therefore, in the case where a reference camera position and a look-up table which are common to the same model are used, even when the cameras are installed in the vehicle as specified by the design, the positions of the cameras are displaced with respect to the surrounding objects. Because of this, as it is necessary to correct the displacement of the cameras one-by-one with the camera calibration method and the like, it takes time to make such correction.

In addition, although it is conceivable to use another method for recalculating the look-up tables after measuring a location displacement of the vehicle by a sensor and the like, there is also another problem that the calculation load is heavy. In particular, as the conventional surroundings monitoring apparatus configured using the look-up tables has an advantage in its small calculation load in execution, the heavy calculation load caused by the correction may lose its advantage.

In addition, other possible methods for correcting distortion in a synthetic image caused by a displacement in the position of a camera includes preparing plural look-up tables appropriate for the degree of the camera position displacement, and selecting one of the look-up tables in execution. However, there is another problem that the amount of memory for storing such look-up tables becomes enormous. Furthermore, there is another problem that an error in a synthetic image may become larger depending on the correction methods.

Thus, the present invention has been conceived in view of the aforementioned circumstances, and aims at providing a surroundings monitoring apparatus and a surroundings monitoring method which can reduce distortions, on a displayed image, which occur due to a position displacement of a camera in the case where the position of the camera is displaced with respect to the reference camera position used for calculating a parameter for synthesizing images, such as a look-up table.

SUMMARY OF THE INVENTION

In order to achieve the aforementioned object, the surroundings monitoring apparatus according to the present invention is a surroundings monitoring apparatus which generates a surrounding image using an image captured by a camera, and the surroundings monitoring apparatus includes: a position displacement information obtainment unit that obtains position displacement information which is information regarding a displacement in a position of the camera; a coordinate transformation parameter obtainment unit that obtains, based on the position displacement information obtained by the position displacement information obtainment unit, a coordinate transformation parameter for correcting a distortion in the surrounding image caused by the displacement in the position; an image synthesis parameter obtainment unit that obtains a reference image synthesis parameter which is used for generating the surrounding image using the captured image, the reference image synthesis parameter including information of image coordinates indicating, on the captured image, a pixel position corresponding to each pixel in the surrounding image; a coordinate transformation unit that performs coordinate transformation on the image coordinates included in the reference image synthesis parameter obtained by the image synthesis parameter obtainment unit, using the coordinate transformation parameter obtained by the coordinate transformation parameter obtainment unit, and that outputs the image coordinates as a transformed image synthesis parameter; and an image synthesis unit that generates the surrounding image by applying the transformed image synthesis parameter to the captured image, and that outputs the generated surrounding image.

According to the surroundings monitoring apparatus and the surroundings monitoring method in the present invention, even in the case of using a captured image with a position displacement of a camera, it is possible to easily reduce distortions on a surrounding image caused by the position displacement of the camera.

FURTHER INFORMATION ABOUT TECHNICAL BACKGROUND TO THIS APPLICATION

The disclosure of Japanese Patent Application No. 2005-038295 filed on Feb. 15, 2005 including specification, drawings and claims is incorporated herein by reference in its entirety.

The disclosure of PCT application No. PCT/JP2006/302478 filed, Feb. 13, 2006, including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 2 is a block diagram showing the configuration of the surroundings monitoring apparatus according to the first embodiment of the present invention.

FIG. 4 is a flowchart showing an operation of the surroundings monitoring apparatus according to the first embodiment of the present invention.

FIG. 10 is a diagram showing an example of a selection method in the image synthesis parameter selection unit according to the first embodiment of the present invention.

FIG. 12 is a diagram showing an example of the coordinate transformation parameter according to the first embodiment of the present invention.

FIG. 20 is a block diagram showing the configuration of the surroundings monitoring apparatus according to the second embodiment of the present invention.

DETAILED DESCRIPTION OF THE INVENTION

Figure 1A:
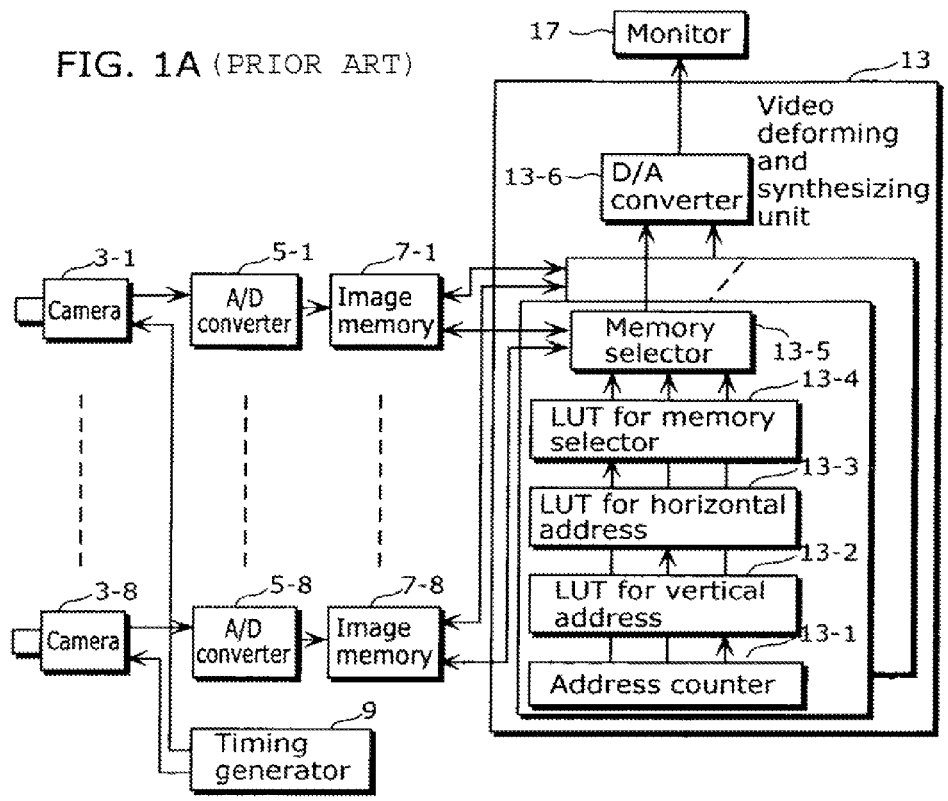
FIG. 1A and FIG. 1B are diagrams showing an example of the surroundings monitoring apparatus according to the conventional technology.
Figure 1B:
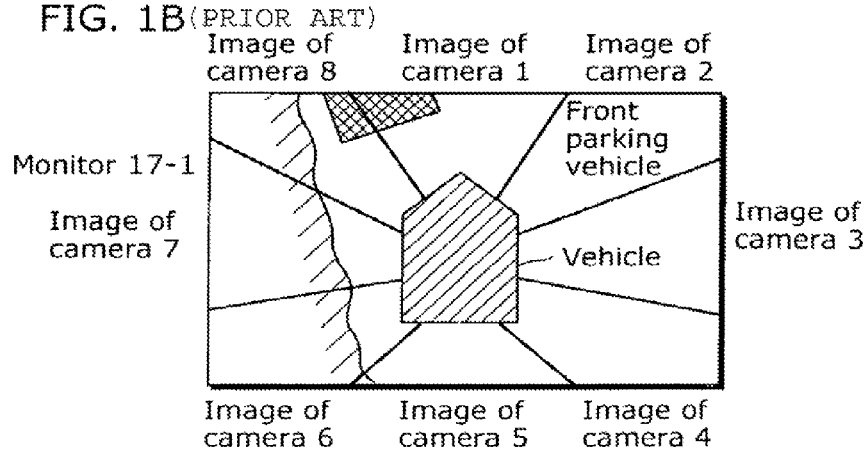

The surroundings monitoring apparatus according to the embodiments of the present invention is a surroundings monitoring apparatus which generates a surrounding image using an image captured by a camera, and the surroundings monitoring apparatus includes: a position displacement information obtainment unit that obtains position displacement information which is information regarding a displacement in a position of the camera; a coordinate transformation parameter obtainment unit that obtains, based on the position displacement information obtained by the position displacement information obtainment unit, a coordinate transformation parameter for correcting a distortion in the surrounding image caused by the displacement in the position; an image synthesis parameter obtainment unit that obtains a reference image synthesis parameter which is used for generating the surrounding image using the captured image, the reference image synthesis parameter including information of image coordinates indicating, on the captured image, a pixel position corresponding to each pixel in the surrounding image; a coordinate transformation unit that performs coordinate transformation on the image coordinates included in the reference image synthesis parameter obtained by the image synthesis parameter obtainment unit, using the coordinate transformation parameter obtained by the coordinate transformation parameter obtainment unit, and that outputs the image coordinates as a transformed image synthesis parameter; and an image synthesis unit that generates the surrounding image by applying the transformed image synthesis parameter to the captured image, and that outputs the generated surrounding image.

With this, even in the case of using a captured image with a position displacement of a camera, distortions on a surrounding image caused by the position displacement of the camera may easily be reduced. In addition, with this, as the coordinate transformation is performed on a reference image synthesis parameter used for generating the surrounding image based on the position displacement information, even in the case of using an image captured by a camera with a position displacement, distortions on the surrounding image caused by the position displacement of the camera may be reduced. In addition, as there is no necessity to prepare plural tables for the reference image synthesis parameter depending on the degree of the camera position displacement, it is possible to prevent an amount of memory from becoming enormous.

In addition, the surroundings monitoring apparatus further includes a graphics synthesis unit that superimposes graphics on the surrounding image generated by the image synthesis unit, and that outputs the image superimposed with graphics, wherein the coordinate transformation parameter obtainment unit may obtain the coordinate transformation parameter based on the position displacement information obtained by the position displacement information obtainment unit and the graphics superimposed by the graphics synthesis unit.

With this, it is possible to perform coordinate transformation suitable for graphics which are superimposed on the surrounding image, and to reduce the displacement between the graphics and the surrounding image.

In addition, the image synthesis parameter obtainment unit may include: an image synthesis parameter storage unit that stores at least one reference image synthesis parameter beforehand; and an image synthesis parameter selection unit that selects a reference image synthesis parameter from the at least one reference image synthesis parameter.

Here, the coordinate transformation parameter obtainment unit may obtain the coordinate transformation parameter based on the position displacement information obtained by the position displacement information obtainment unit and the reference image synthesis parameter selected by the image synthesis parameter selection unit.

With this, as the coordinate transformation is performed depending on the reference image synthesis parameter used for generating the surrounding image, in other words, depending on the composition of the surrounding image, even in the case where the captured image with a camera position displacement is used, it is possible to reduce the distortions on the surrounding image caused by the camera position displacement.

In addition, it is possible that: the reference image synthesis parameter includes plural pieces of information of image coordinates for a plurality of the captured images, the information being used for generating the surrounding image using a plurality of the images captured by plural cameras; the position displacement information obtainment unit obtains plural pieces of the position displacement information which are respective pieces of information regarding displacements in the positions of the plural cameras; the coordinate transformation parameter obtainment unit obtains a plurality of the coordinate transformation parameters based on the plural pieces of position displacement information obtained by the position displacement information obtainment unit; the coordinate transformation unit performs coordinate transformation on the image coordinates included in the reference image synthesis parameter obtained by the image synthesis parameter obtainment unit, using the plurality of coordinate transformation parameters obtained by the coordinate transformation parameter obtainment unit, and outputs the image coordinates as the transformed image synthesis parameter; and the image synthesis unit generates the surrounding image by applying the plurality of coordinate transformation parameters to the plurality of captured images, the coordinate transformation parameters being obtained by the coordinate transformation parameter obtainment unit.

With this, as the coordinate transformation is performed depending on the reference image synthesis parameter used for generating the surrounding image, in other words, depending on the composition of the surrounding image, even in the case where the captured image with a camera position displacement is used, it is possible to reduce the distortions of a plurality of the captured images on the surrounding image.

In addition, the image synthesis parameter obtainment unit may obtain the reference image synthesis parameter which includes information of the image coordinates out of the area of the captured image.

With this, even when the image coordinates included in the reference image synthesis parameter is out of the area of the captured image, the image coordinates obtained by performing coordinate transformation on the image coordinates may be within the area of the captured image. As a result, it is possible to increase the image coordinates which are within the area of the captured image included in the transformed image synthesis parameter, in other words, to increase valid pixels on the surrounding image.

Note that the present invention can be realized not only as such a surroundings monitoring apparatus, but also as a surroundings monitoring method having the characteristic units of the aforementioned surroundings monitoring apparatus as steps, and as a program which causes a computer to execute such steps. In addition, it is obvious that such program can be distributed via a recording medium, such as a CD-ROM and via a transmission medium, such as the Internet.

Each of the embodiments in the present invention is described hereinafter with reference to the diagrams.

First Embodiment

FIG. 2 is a block diagram showing the configuration of the surroundings monitoring apparatus according to the first embodiment of the present invention.

The surroundings monitoring apparatus is, for example, an apparatus which is installed in a moving object such as an automobile, and generates a synthetic image (surrounding image) by deforming images captured by cameras. As shown in FIG. 2, the apparatus includes cameras 101, an A/D converter 102, a frame memory 103, an image synthesis unit 104, a graphics synthesis unit 105, a D/A converter 106, a display 107, a position displacement information obtainment unit 108, a moving object state detection unit 109, a coordinate transformation parameter obtainment unit 120, a coordinate transformation unit 112, and an image synthesis parameter obtainment unit 121.

The cameras 101 capture images of the surroundings of the vehicle and output image sequence. The A/D converter 102 digitizes the image sequence which is an analog signal. The frame memory 103 temporarily holds the digitized image sequence. Note that at least one of the camera 101, the A/D converter 102 and the frame memory 103 need to be equipped with. In addition, the frame memory 103 is a frame memory with double buffer configuration which successively reads the image sequence outputted from the cameras 101 while temporarily holding image data having at least one frame. In addition, the frame memory 103 is configured such that arbitrary pixel data for an image having the held single frame can be read in response to a read request from the image synthesis unit 104.

The position displacement information obtainment unit 108 receives a position displacement degree of each camera through the user's manipulation of the switch, and outputs the received position displacement degree of each camera as the camera position displacement information. Although the position displacement degree of each camera is received by the user in the present first embodiment, the present invention is not limited to such a case. For example, the position displacement degree of each camera may be detected by a sensor and the like, and the detected position displacement degree of each camera may be outputted as the camera position displacement information.

The moving object state detection unit 109 detects vehicle speed, a shift lever, and a steering angle and outputs them as a moving object state. Although the vehicle speed, shift lever, and steering angle are detected in the present first embodiment, the present invention is not limited to such a case. For example, the moving object state detection unit 109 has only to output, as the moving object state, detection results from one or more of switches which the user manipulates, such as an ignition key, a shift lever, a blinker and the like, or sensors such as a vehicle speed sensor or a steering angle sensor that detects speed and a moving direction of the vehicle.

The coordinate transformation parameter obtainment unit 120 includes a coordinate transformation parameter selection unit 110 and a coordinate transformation parameter storage unit 111. The coordinate transformation parameter storage unit 111 stores a plurality of coordinate transformation parameters beforehand. The coordinate transformation parameter selection unit 110 selects and outputs one of the coordinate transformation parameters stored in the coordinate transformation parameter storage unit 111 according to the camera position displacement information.

The image synthesis parameter obtainment unit 121 includes an image synthesis parameter selection unit 113 and an image synthesis parameter storage unit 114. The image synthesis parameter storage unit 114 stores at least one reference image synthesis parameter and at least one graphics parameter beforehand. The image synthesis parameter selection unit 113 selects and outputs, depending on the moving object state, one of the reference image synthesis parameters and one of the graphics parameters which are stored in the image synthesis parameter storage unit 114.

The coordinate transformation unit 112 performs coordinate transformation on the image coordinates of the captured image included in the reference image synthesis parameter outputted from the image synthesis parameter selection unit 113, using the coordinate transformation parameter outputted from the coordinate transformation parameter selection unit 110, and outputs the image coordinates as a transformed image synthesis parameter.

The image synthesis unit 104 sequentially reads images from the frame memory 103 depending on the transformed image synthesis parameter outputted from the coordinate transformation unit 112, generates a synthetic image, and outputs the generated image. The graphics synthesis unit 105 superimposes, on the synthetic image outputted from the image synthesis unit 104, the graphics corresponding to the graphics parameter outputted from the image synthesis parameter selection unit 113, and outputs it as the synthetic image with the graphics. The D/A converter 106 transforms the synthetic image with the graphics to an analog signal. The display 107 displays the synthetic image with the graphics which has been transformed into the analog signal.

Figure 3:
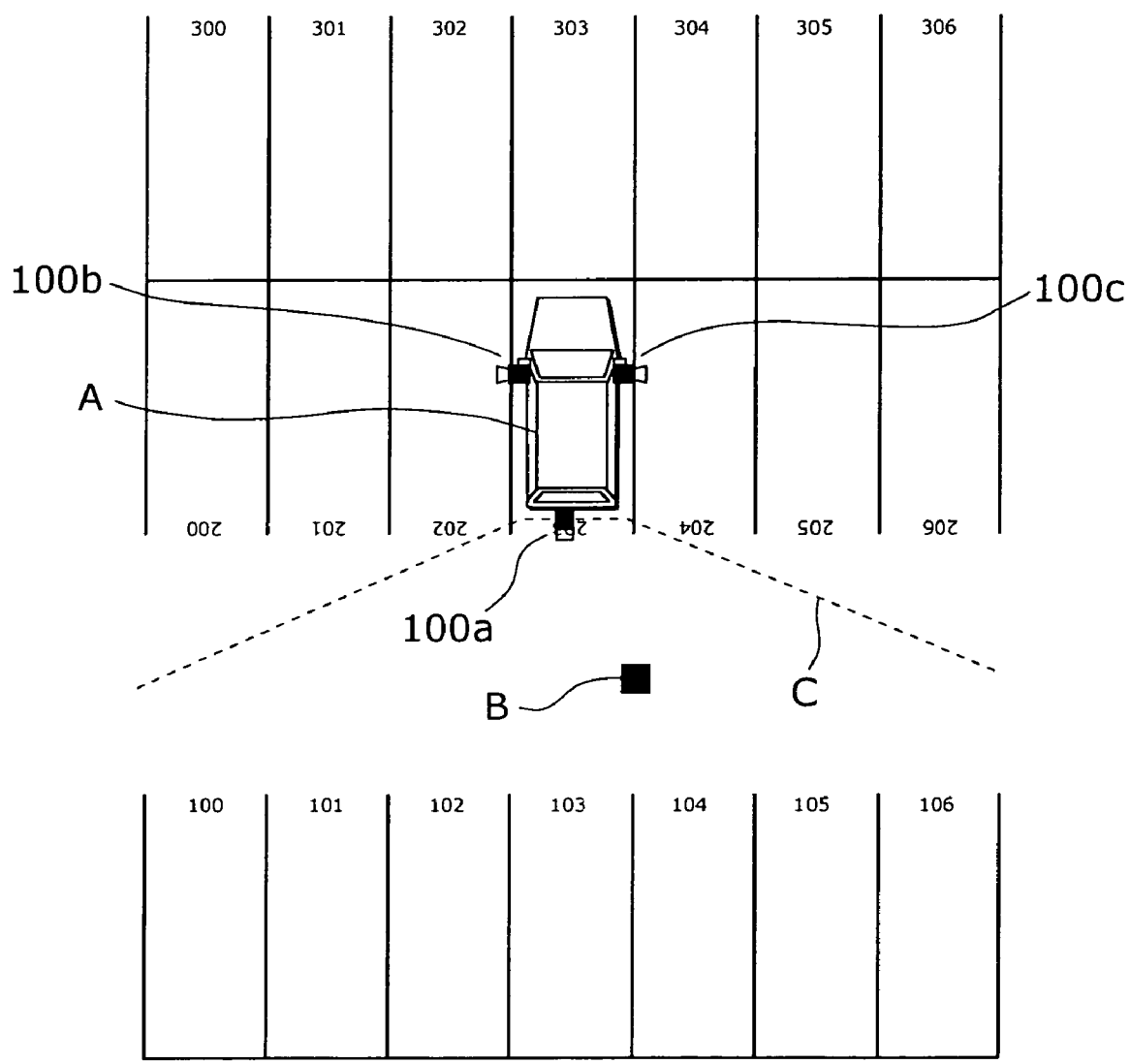
FIG. 3 is a diagram showing an example of a surrounding condition according to the first embodiment of the present invention.

The present first embodiment describes the case where the surroundings monitoring apparatus is installed in a vehicle A and three cameras 101 are present. FIG. 3 is a diagram showing an installation example in this case. A plurality of the cameras 101 in FIG. 2 correspond to a camera 101a to 101c (cameras 1-3) in FIG. 3, and each camera is installed in the vehicle so as to capture an image of the surroundings of the vehicle. In addition, it is assumed that the display 107 is installed in a position which can be seen from a driver in the vehicle, and other processing units are installed inside the vehicle. Note that the number of the cameras 101 and the respective installation positions are not limited to the ones in shown in FIG. 3, and the installation positions of other processing units are not limited in the same manner.

The operation of the surroundings monitoring apparatus with the aforementioned configuration is described hereinafter. FIG. 4 is a flowchart showing a flow of the operation of the surroundings monitoring apparatus.

First, as an initial state, the operation of the surroundings monitoring apparatus in the case where there is no camera position displacement is first described, and then the operation of the surroundings monitoring apparatus in the case where the camera position displacement has occurred is described.

The cameras 101 capture images of the surroundings of the vehicle, and output a video signal corresponding to each image, the A/D converter 102 digitizes the video signal and outputs the digitized image, and the frame memory 103 temporarily stores the digitized image (Step S101). Storing and updating images in the frame memory 103 is successively performed in synchronization with the video signals outputted from the cameras 101.

Figure 5A:
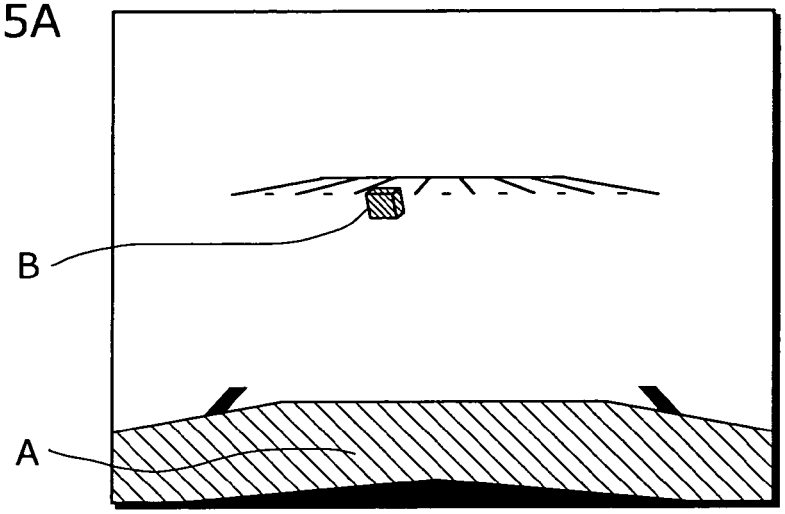
FIG. 5A to FIG. 5C are diagrams showing an example of captured images according to the first embodiment of the present invention.
Figure 5B:
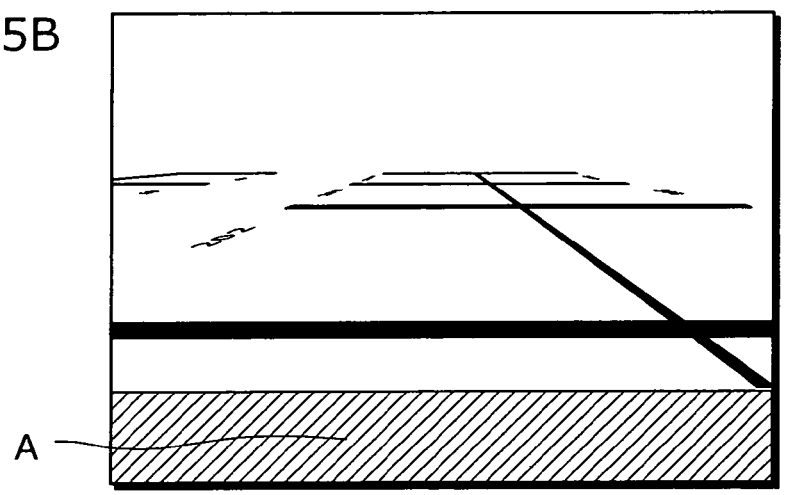
Figure 5C:
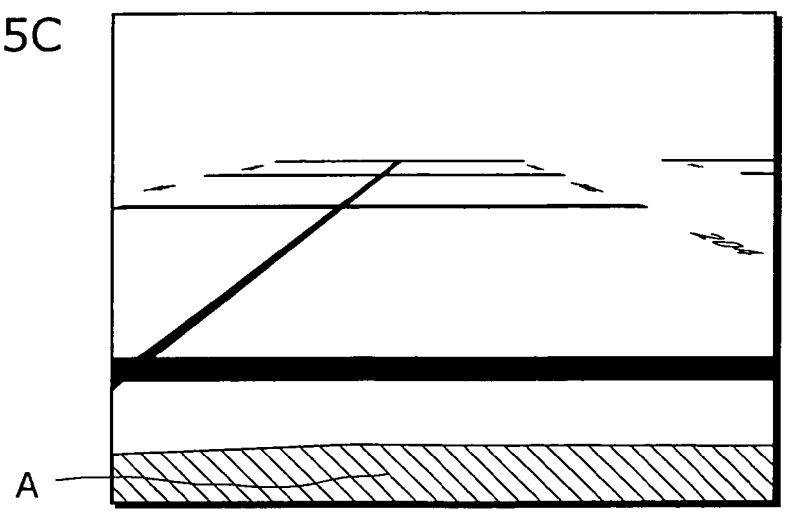

Three cameras, namely, the camera 101a to 101c are installed in a back side, a left side, and a right side of the vehicle so as to respectively capture an image of rear, left, and right of the vehicle as shown in FIG. 3. In addition, in FIG. 3, a cubic obstacle B is placed in a location about three meters distant from the vehicle's rear end, which is diagonally backward right of the vehicle. FIGS. 5A to 5C are diagrams showing examples of images captured by the cameras 101a to 101c in the imaging situation of FIG. 3, where FIG. 5A shows an image captured at the rear of the vehicle by the camera 101a; FIG. 5B shows an image captured at the left side of the vehicle by the camera 101b; and FIG. 5C shows an image captured at the right side of the vehicle by the camera 101c. In the frame memory 103, the images shown in FIGS. 5A to 5C are stored in digitized form.

The position displacement information obtainment unit 108 obtains the position displacement of each camera, and outputs it as the camera position displacement information (Step S102). The specific example of the camera position displacement is described hereinafter.

Figure 6:
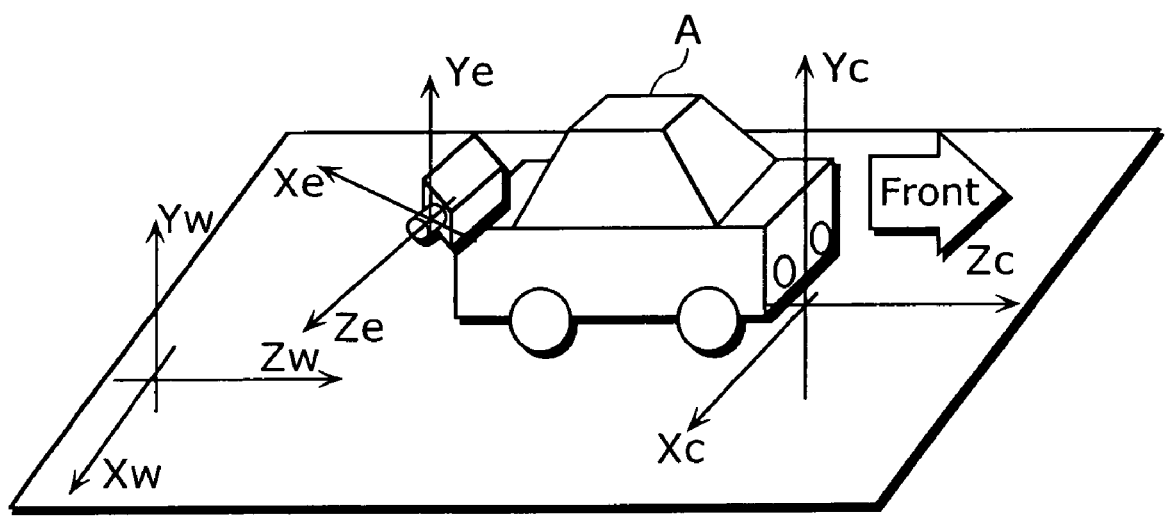
FIG. 6 is a diagram showing an example of a coordinate system according to the first embodiment of the present invention.

FIG. 6 is a diagram showing the arrangement of a camera coordinate system (Xe, Ye, Ze), a vehicle coordinate system (Xc, Yc, Zc), and a world coordinate system (Xw, Yw, Zw). As the cameras are fixed to the vehicle, the positions of the cameras and a photographic subject in the surroundings of the vehicle are determined by a relationship of two positions, namely a relationship between a position in the vehicle coordinate system with respect to the world coordinate system and a position in the camera coordinate system with respect to the vehicle coordinate system. The former position is referred to as a vehicle location, and the latter position is referred to as an installation position of a camera. Meanwhile, a camera position displacement is a difference from a reference position in the case where a vehicle location and an installation position of a camera at the time of generating a reference image synthesis parameter are the reference positions, and the camera position displacement occurs due to the displacement in the vehicle location and the displacement in the installation position of the camera. A relational expression of "E=Ee×Ec" holds, assuming that the camera position displacement is E, the location displacement of a vehicle is Ec, and the installation position displacement of a camera is Ee, and expressing these as a 4×4 matrix which indicates three-dimensional rotation and translation.

The camera installation position displacement Ee can be expressed by six parameters of three-dimensional translation and rotation (ex, ey, ez, ewx, ewy, ewz), and the k-th camera installation position displacement Eek can be expressed as (exk, eyk, ezk, ewxk, ewyk, ewzk). The vehicle is assumed to be free to move in an X-Z plane (road surface) with respect to the world coordinate system, and to rotate around the Y-axis, and the location displacement Ec of the vehicle can be expressed by three parameters (eyc, ewxc, ewzc). The position displacement Ek for the k-number of cameras are collectively referred to as camera position displacement information.

Note that in order to simplify the description in the first embodiment, the camera position displacement E is expressed by a single parameter (ewy), which is displacement of the rotation around the Y-axis in the camera coordinate system with respect to the vehicle coordinate system.

In this manner, the position displacement information obtainment unit 108 receives a value of a position displacement of each camera through the user's manipulation of the switch and outputs the inputted position displacement Ek for the k-number of cameras as the camera position displacement information. As an initial state, it is assumed that there is no manipulation of the switch by the user, and as the initial value, the camera's position displacement degree ewyk=0 is outputted.

The moving object state detection unit 109 detects and outputs the vehicle speed, shift lever, and steering angle as the moving object state (Step S103). Here, the moving object state detection unit 109 outputs, as the moving object state, the state that "the vehicle is stopped, the shift lever is placed in reverse (hereinafter referred to as "R"), and the steering is in a neutral position".

Next, the image synthesis parameter selection unit 113 selects and outputs, depending on the moving object state outputted from the moving object state detection unit 109, one of the reference image synthesis parameters and one of the graphics parameters which are stored in the image synthesis parameter storage unit 114 (Step S104). Each parameter stored in the image synthesis parameter storage unit 114 and an operation of the image synthesis parameter selection unit 113 are described in detail hereinafter.

Figure 7:
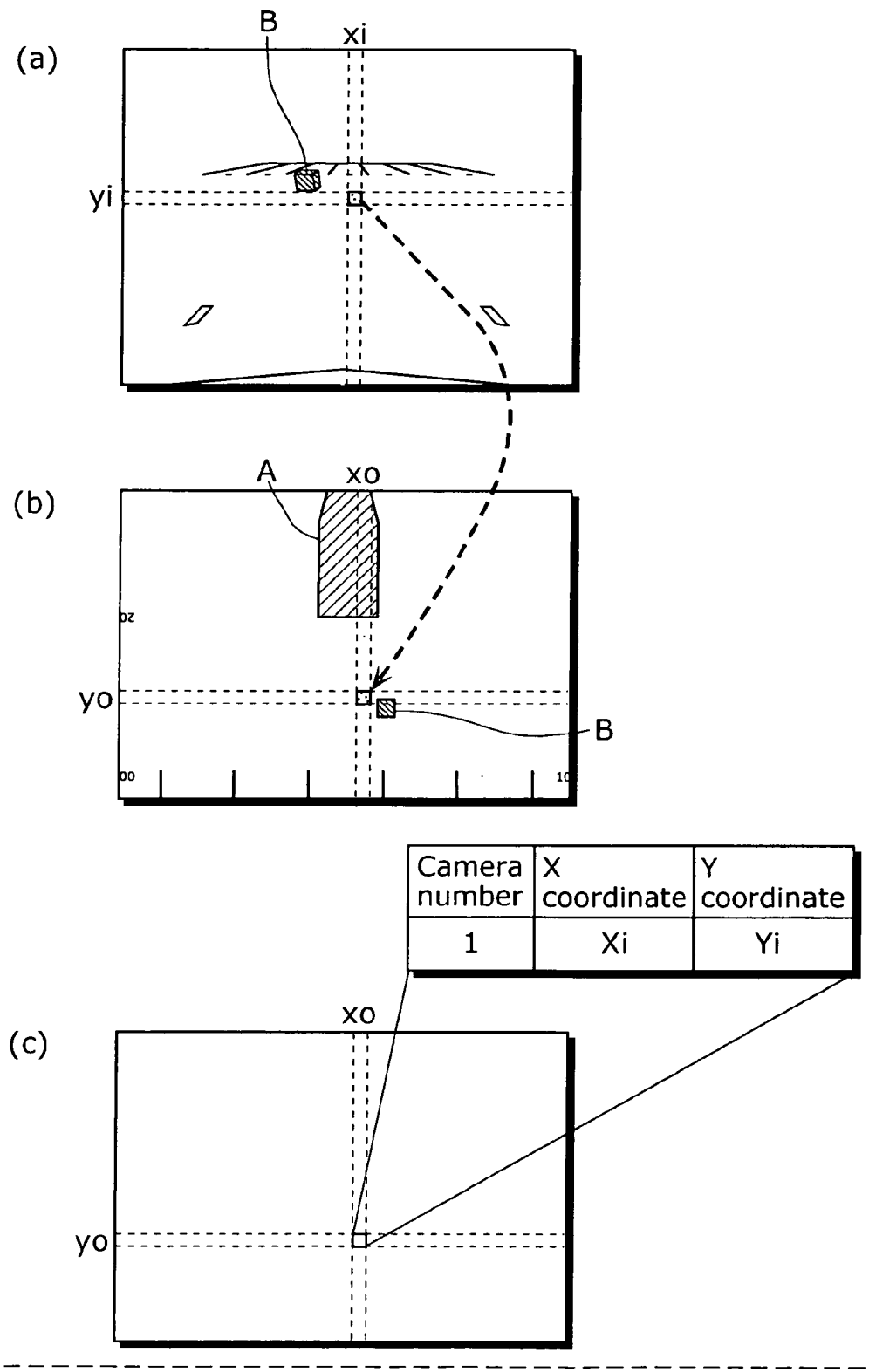
FIG. 7 is a diagram showing examples of reference image synthesis parameters according to the first embodiment of the present invention.

FIGS. 7 (*a*), (*b*), and (*c*) is a diagram for describing reference image synthesis parameters stored in the image synthesis parameter storage unit 114, where FIG. 7 (*a*) shows an example of a captured image, FIG. 7 (*b*) shows an example of a synthetic image, and FIG. 7 (*c*) shows an example of a reference image synthesis parameter in the case of generating the synthetic image from the captured images. The reference image synthesis parameter in FIG. 7 (*c*) can be expressed as a two-dimensional array corresponding to each pixel of the synthetic image on a one-to-one basis. Each element of the two-dimensional array is composed of the camera number of the captured image and pixel coordinates (an X coordinate and a Y coordinate in the present embodiment) which correspond to each pixel in the synthetic image. In the example of FIG. 7 (*a*) to (*c*), the information "camera number=1, coordinates (xi, yi)" is stored as coordinates (xo, yo) of a reference image synthesis parameter. This indicates that the pixel of the image captured by the camera 1 (xi, yi) is used as the pixel in the coordinates (xo, yo) of the synthetic image. By using the reference synthetic image parameter having the composition shown in the FIG. 7 (*a*) to (*c*), it is possible to describe a correspondence between a synthetic image and a plurality of the captured images.

Figure 8A:
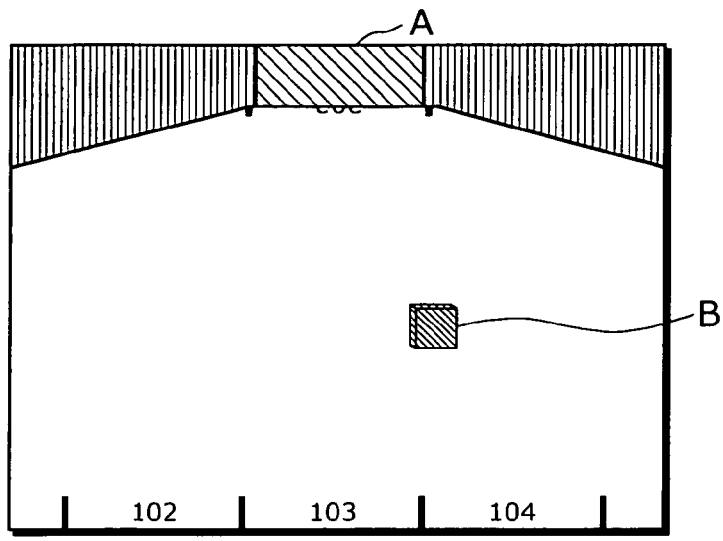
FIG. 8A to FIG. 8C are diagrams showing an example of synthetic images according to the first embodiment of the present invention.
Figure 8B:
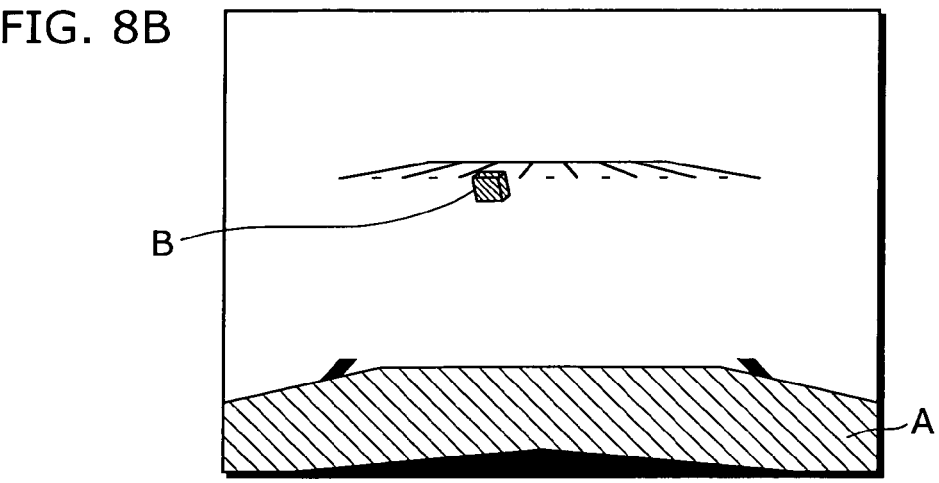
Figure 8C:
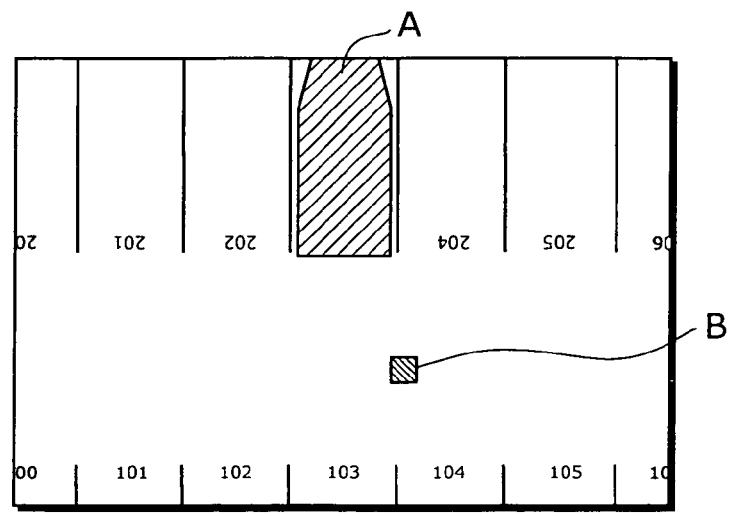

FIGS. 8A to 8C are diagrams showing an example of a plurality of synthetic images generated by using a plurality of the reference image synthesis parameters. Illustrated here is the synthetic image generated by using each reference image synthesis parameter in the case where the images in FIGS. 5A to 5C are captured in the imaging situation of FIG. 3. For the same captured image, by using a reference image synthesis parameter which differs in the camera number and the captured image coordinate values, a synthetic image with a different composition can be generated. FIG. 8A is an example of a synthetic image generated by a reference image synthesis parameter 1, and the reference image synthesis parameter 1 indicates a correspondence between an image captured by the camera 101*a* and a synthetic image with a composition seen from above the vehicle. FIG. 8B is an example of a synthetic image generated by a reference image synthesis parameter 2, and the reference image synthesis parameter 2 indicates a correspondence with a synthetic image having the same composition as the image captured by the camera 101*a*. FIG. 8C is an example of a synthetic image generated with a reference image synthesis parameter 3, and the reference image synthesis parameter 3 indicates a correspondence between images captured by the camera 101*a* to 101*c* and a synthetic image with a composition in which an large area covering from the side to the rear of the vehicle is seen from above the vehicle. As the method of creating a reference image synthesis parameter is described in detail in the aforementioned Patent Document 3, the detailed description is omitted here.

Figure 9A:
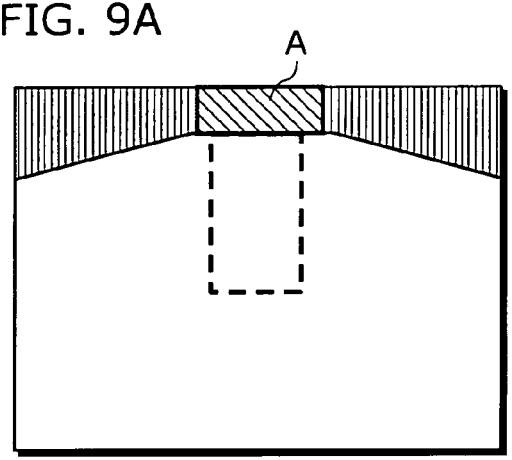
FIG. 9A to FIG. 9E are diagrams showing an example of graphics superimposed by the graphics synthesis unit according to the first embodiment of the present invention.
Figure 9B:
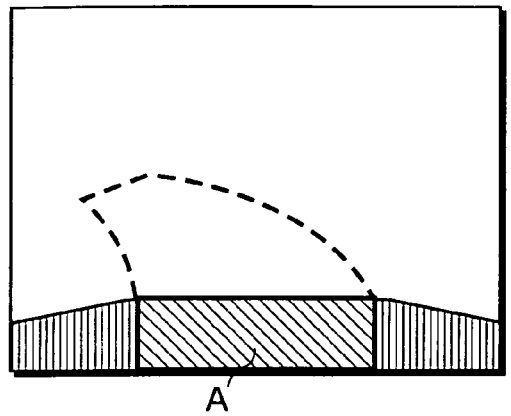
Figure 9C:
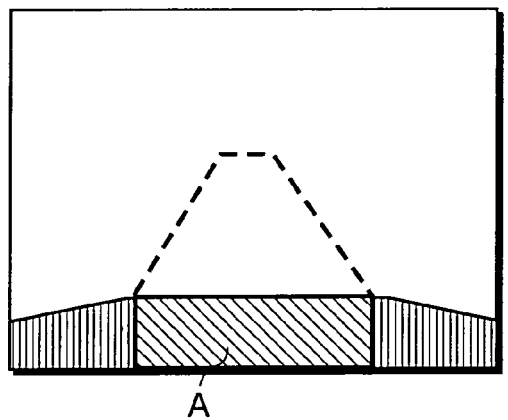
Figure 9D:
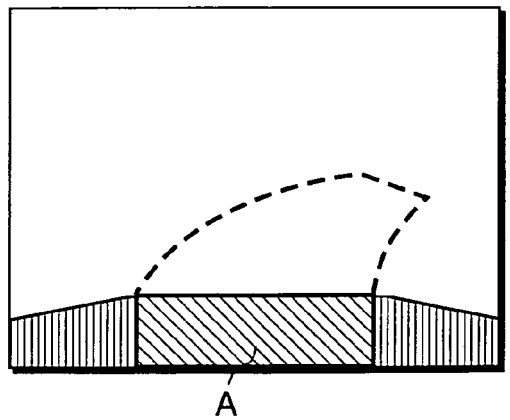
Figure 9E:
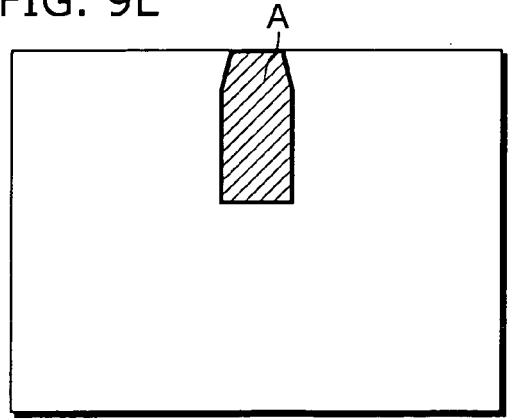

FIGS. 9A to 9E are diagrams showing an example of graphics generated using a graphics parameter. It is assumed that the graphics parameter is stored as an image file having the same size as the synthetic image. The graphics parameter 1 that generates the graphics shown in FIG. 9A corresponds to the reference image synthesis parameter 1, graphics parameters 2-1 to 2-3 that generate the graphics shown in FIGS. 9B to 9D correspond to the reference image synthesis parameter 2, and the graphics parameter 3 that generates the graphics shown in FIG. 9E corresponds to the reference image synthesis parameter 3. In addition, each dashed line rendered in FIGS. 9A to 9E is graphics indicating a particular and predetermined distance with respect to the reference vehicle. For example, each dashed line rendered in FIGS. 9A and 9C is a boundary of an area enclosed by an extension line having the same length as the width of the vehicle and a linear line three meters distant from the rear of the vehicle, and each dashed line rendered in FIGS. 9B and 9D is a boundary of an area enclosed by the width of the vehicle on a predicted course in a certain steering angle and a linear line in the case where the vehicle moves three meters in the traveling direction. Therefore, the graphics generated by the graphics parameters include reference information about a distance to the vehicle and a position with respect to the vehicle. Such graphics can be generated beforehand by associating a position on a synthetic image with a position on a road plane or a position on the captured image when the aforementioned reference image synthesis parameter is created.

FIG. 10 is a diagram showing an example of a method for selecting a reference image synthesis parameter in the image synthesis parameter selection unit 113. The image synthesis parameter selection unit 113 respectively selects a reference image synthesis parameter and a graphics parameter depending on a combination of the vehicle speed, shift lever, and steering angle which are inputted as the moving object state as shown in FIG. 10. For example, in the case where "the vehicle is moving, the shift lever is placed in R, and the steering is in a neutral position", "the reference image synthesis parameter 2, the graphics parameter 2-2" is selected.

Here, since the moving object state is a state where "the vehicle is stopped, the shift lever is placed in R, and the steering is in a neutral position", the image synthesis parameter selection unit 113 then selects and outputs the reference image synthesis parameter 1 and graphics parameter 1.

Next, the coordinate transformation parameter selection unit 110 selects and outputs, according to the camera position displacement information, one of the coordinate transformation parameters stored in the coordinate transformation parameter storage unit 111 (Step S105). Next, the coordinate transformation unit 112 performs coordinate transformation on the image coordinates of the captured image which is included in the reference image synthesis parameter outputted from the image synthesis parameter selection unit 113 using the coordinate transformation parameter outputted from the coordinate transformation parameter selection unit 110 and outputs the image coordinates as a transformed image synthesis parameter (Step S106).

In the present first embodiment, the coordinate transformation performed in the coordinate transformation unit 112 is projective transformation, and the coordinate transformation parameter stored in the coordinate transformation parameter storage unit 111 is a set of coefficients of projective transformation for every camera.

A specific example of the coordinate transformation parameter as well as the operation of the coordinate transformation parameter selection unit 110 and the coordinate transformation unit 112 are described in detail hereinafter.

The coordinate transformation unit 112 performs coordinate transformation by projective transformation using the following Equation 1:

(Formula 1)

$$x'_i = \frac{ax_i + by_i + c}{gx_i + hy_i + 1}$$
$$y'_i = \frac{dx_i + ey_i + f}{gx_i + hy_i + 1},$$

Equation 1

In Equation 1, eight coefficients (a, b, c, d, e, f, g, h) of projective transformation are referred to as coordinate transformation parameters. The coordinates (xi, yi) are image coordinates of the captured image included in the reference image synthesis parameter, and the coordinates (xi', yi') are image coordinates of the captured image included in the transformed image synthesis parameter.

The coordinate transformation parameters stored in the coordinate transformation parameter storage unit 111 are a plurality of coordinate transformation parameters P which correspond to the values of the camera position displacement E and the camera number k. The coordinate transformation parameter P is expressed as P (E, k) as it depends upon the camera position displacement E and camera number k. It is assumed that in the present embodiment, the camera position displacement E is limited to the camera installation position displacement ewy, that the value can take 21 levels of values per degree in the range between −10 to +10 degrees, and that 21 coordinate transformation parameters corresponding to each of such degree angle are calculated and stored beforehand for each camera number.

Figure 11A:
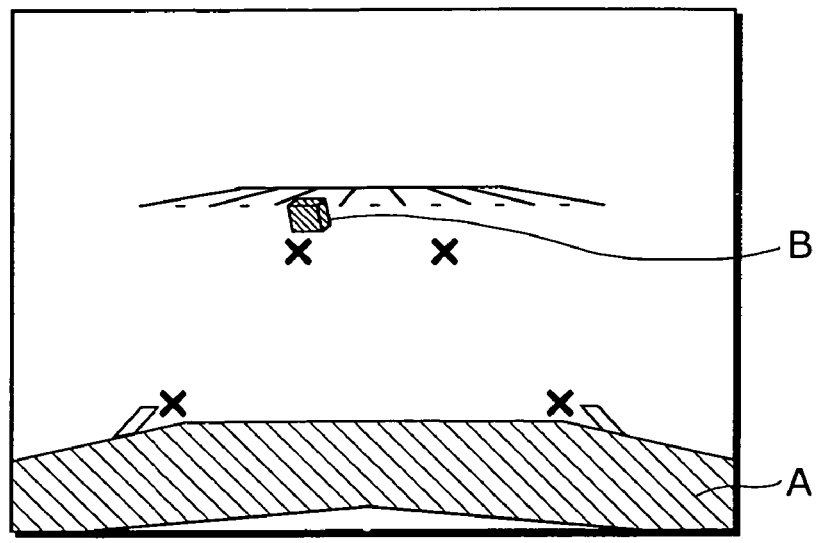
FIG. 11A and FIG. 11B are diagrams showing an example of corresponding points used for the calculation of the coordinate transformation parameter according to the first embodiment of the present invention.
Figure 11B:
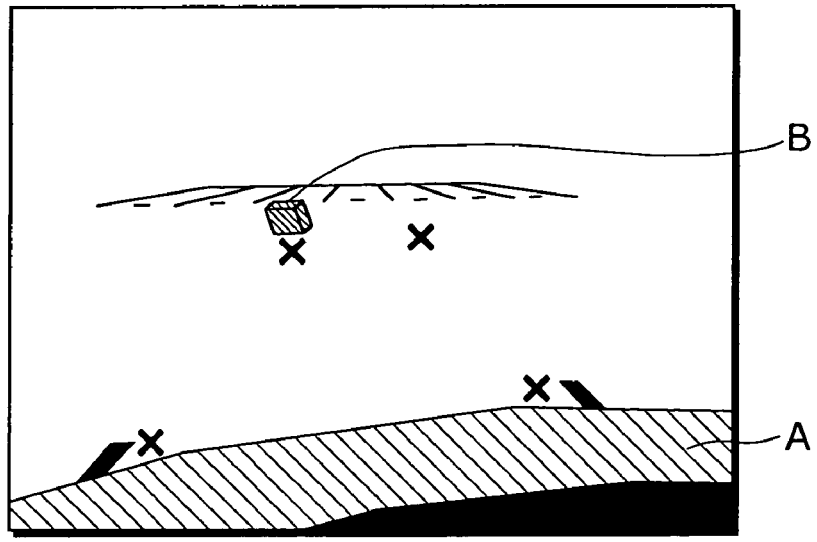

An example of a method for calculating the coordinate transformation parameter P (E, k) which corresponds to the position displacement E for the k-th camera is described hereinafter. Here, it is assumed that the image captured in a reference camera position is shown in FIG. 11A, and the image in the case where the camera position displacement is E is shown in FIG. 11B. It is also assumed that the image coordinates which indicate a point on the captured image without camera position displacement is expressed as (xi, yi), the image coordinates which indicate a point on the captured image with the position displacement is expressed as (xi', yi'), and that there is a relationship of Equation 1 between the respective image coordinates. In this case, by providing four or more corresponding points to the image, it is possible to calculate a coordinate transformation parameter so as to obtain a minimal square error in the Equation 1. As a method for calculating a parameter of projective transformation from such four or more corresponding points is well known, the detailed description is omitted. As described above, it is possible to calculate a coordinate transformation parameter P (E, k) beforehand using the captured image with all possible kinds of the camera position displacement E with respect to the image captured in the reference camera position. Here, the fact that a relationship between the corresponding points of image coordinates can be expressed by Equation 1 in the case where the camera position displacement E is limited to rotation, or in the case where a photographic subject in the image is present on one plane is widely known as described in "Gazo Rikai (Image understanding)" (Author: Kenichi Kanatani, Morikita Shuppan Co., Ltd.) and the like. Therefore, in the case where a road plane occupies a large percentage of the captured image, for example, it is possible to transform the image to an image with no camera position displacement on the road by performing projective transformation on the image with the camera position displacement.

It is assumed that the coordinate transformation parameter selection unit 110 selects and outputs a coordinate transformation parameter from the coordinate transformation parameter storage unit 111 depending on the camera position displacement E for every camera in the camera position displacement information. FIG. 12 is a diagram showing an example of the coordinate transformation parameter P (E, k) which corresponds to the camera number k and camera position displacement E. Since the camera position displacement information indicates ewy=0 for all cameras as an initial state, (a, b, c, d, e, f, g, h)=(1,0,0,0,1,0,0,0) is selected as the coordinate transformation parameter P (E, k) which corresponds to ewy=0.

Next, the coordinate transformation unit 112 inputs a reference image synthesis parameter and a coordinate transformation parameter for every camera, and calculates (xi', yi') by performing coordinate transformation of Equation 1, using the coordinate transformation parameter corresponding to the camera number, on the image coordinates (xi, yi) for the camera number and the captured image, which are respective elements of the reference image synthesis parameter. Then, the coordinate transformation unit 112 replaces respective image coordinates for the captured image in the reference image synthesis parameter (xi, yi) with the calculated image coordinates (xi', yi'), and outputs the transformed image synthesis parameter.

As an initial state, the reference transformation parameter P (E, k) is (a, b, c, d, e, f, g, h)=(1,0,0,0,1,0,0,0). Therefore, the outputted transformed image synthesis parameter is the same as the reference image synthesis parameter 1.

Next, the image synthesis unit 104 sequentially reads the captured images corresponding to each element of the transformed image synthesis parameter, using the transformed image synthesis parameters generated by the coordinate transformation selection unit 112, and outputs them as a synthetic image (Step S107).

As the initial state, because the same parameter as the reference image synthesis parameter 1 is outputted as a transformed image synthesis parameter, the synthetic image in FIG. 8A is outputted in the case where the captured images are, for example, those shown in FIGS. 5A to 5C.

Next, the graphics synthesis unit 105 superimposes, on the synthetic image generated in the image synthesis unit 104, the graphics corresponding to the graphics parameter selected in the image synthesis parameter selection unit 113 (Step S108). Here, as the graphics parameter 1 is selected by the image synthesis parameter selection unit 113, the graphics in FIG. 9A is superposed on the synthetic image, and the synthetic image with the graphics is outputted.

The D/A converter 106 transforms the synthetic display image outputted from the graphics synthesis unit 105 into a video signal and outputs the video signal, and the display 107 displays the video signal (Step S109).

Through the described operations in each processing unit, the synthetic image with graphics in an initial state is generated and displayed on the display 107.

Figure 13A:
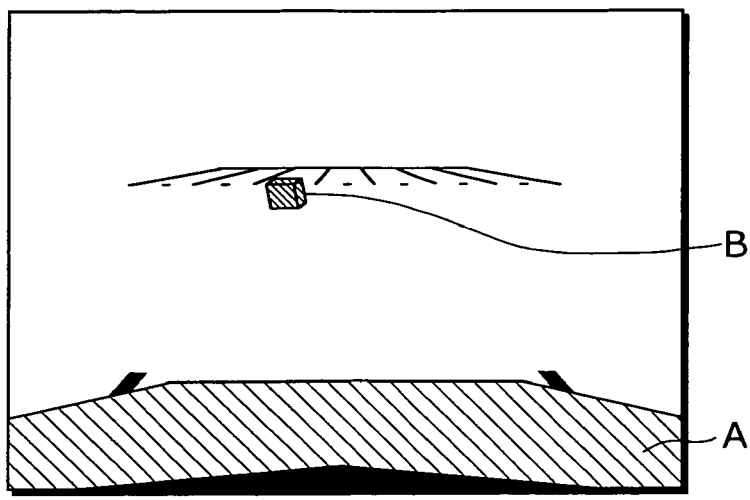
FIG. 13A to FIG. 13C are diagrams showing an example of generated images in the process of the operation according to the first embodiment of the present invention.
Figure 13B:
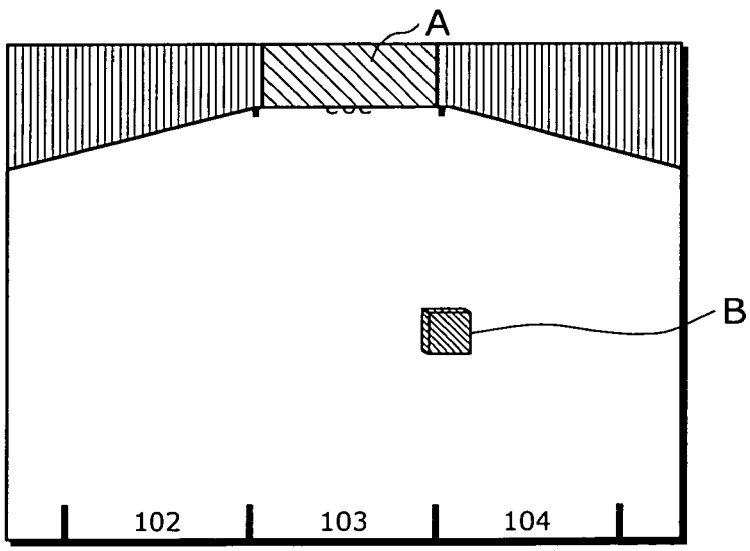
Figure 13C:
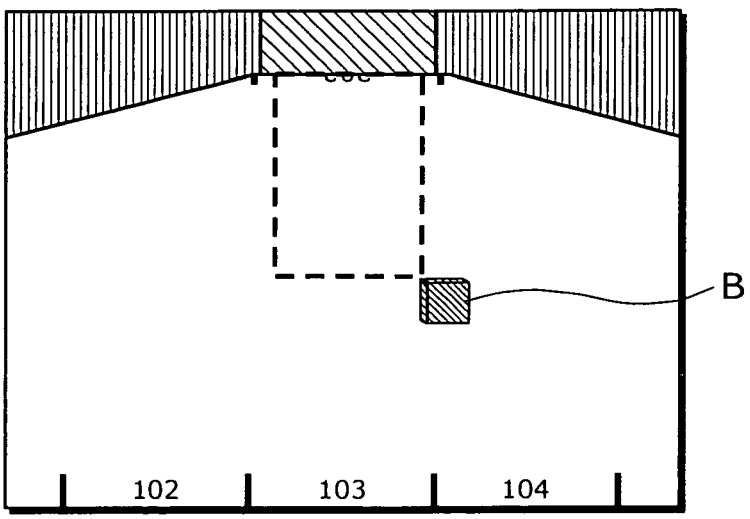

FIGS. 13A to 13C are diagrams showing an example of the images to be generated by the operation in an initial state. FIG. 13A is an image captured by the camera 101a, FIG. 13B is an example of a synthetic image outputted from the image synthesis unit 104, and FIG. 13C is an example of a synthetic image with the graphics outputted from the graphics synthesis unit 105 and displayed on the display 107. In the case where the driver monitors the synthetic image with graphics in FIG. 13C, a position relationship between a dashed line and an obstacle can be easily understood, as the dashed line used as a reference for the position is superimposed on the image.

Next, the case where the camera position displacement occurs from the initial state and the displacement is corrected is described.

Figure 14:
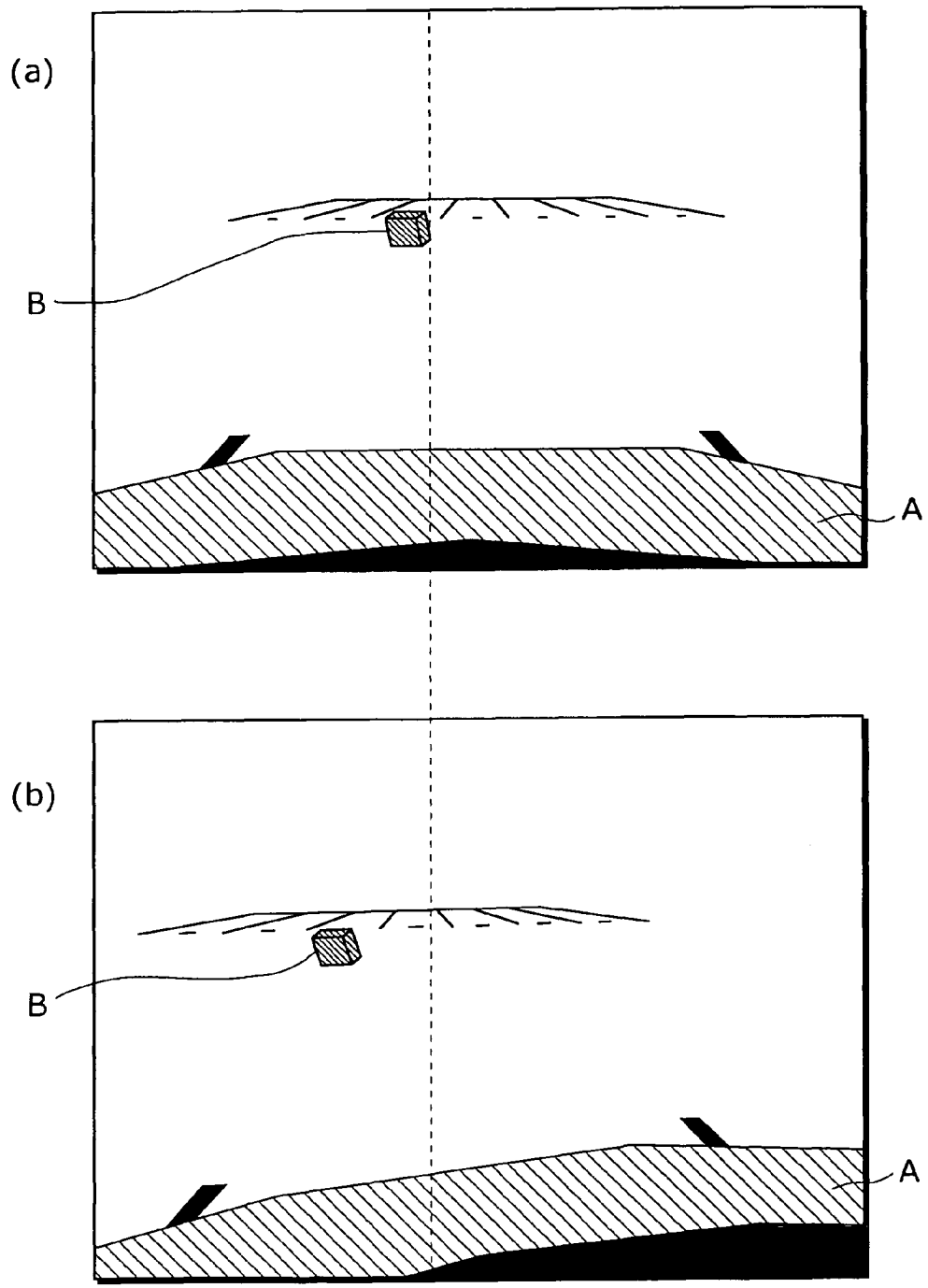
FIG. 14 is a diagram showing an example of a captured image in the case where a position of the camera is displaced according to the first embodiment of the present invention.
Figure 15A:
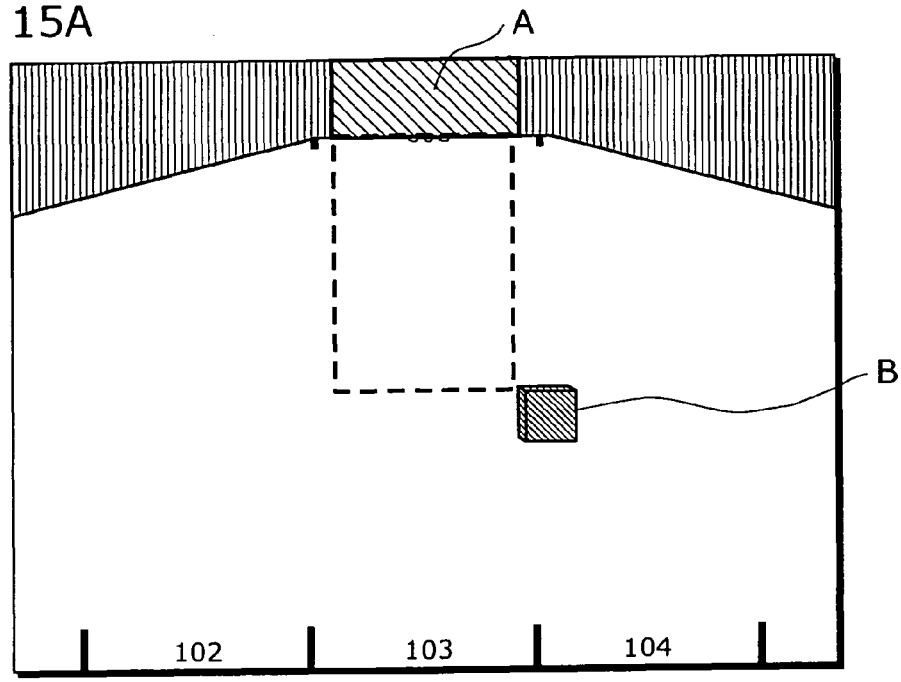
FIG. 15A and FIG. 15B are diagrams showing an example of synthetic images in the case where a position of the camera is displaced according to the first embodiment of the present invention.
Figure 15B:
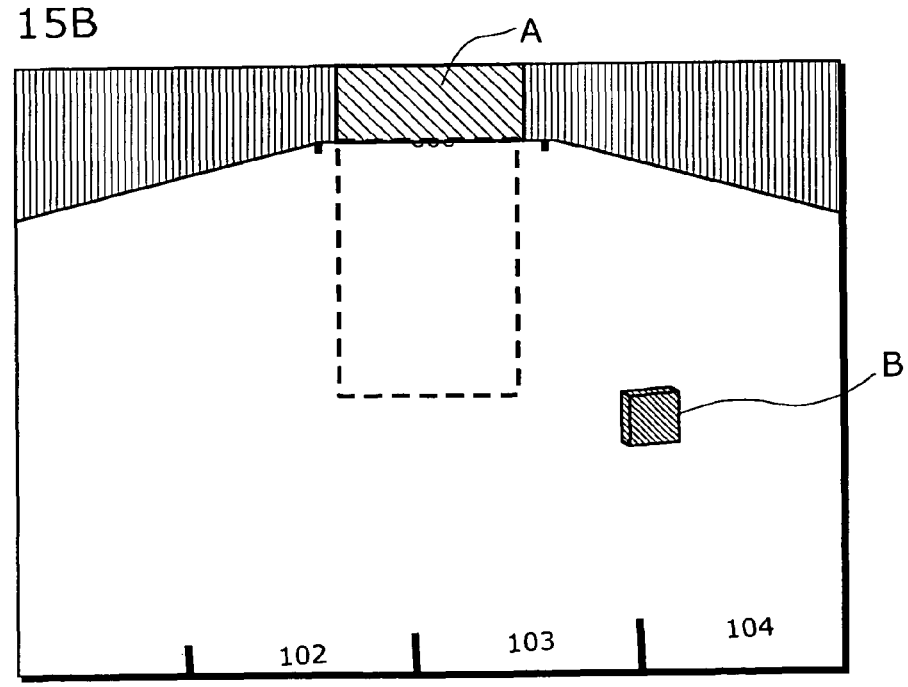

FIG. 14 is a diagram showing an example of a captured image when the position of the camera 101a is displaced from the reference position. FIG. 14 (a) is a captured image without displacement, and FIG. 14 (b) is an example of a captured image in the case where a camera installation position is displaced by five degrees by rotation to the right direction with respect to the vertical axis. FIGS. 15A and 15B are diagrams showing an example of synthetic images with graphics generated by the aforementioned operation in the initial state in the case where FIG. 14 is used as the captured image. FIG. 15A is a synthetic image with graphics in the case where FIG. 14 (a) is used as the captured image, and FIG. 15B is a synthetic image with graphics in the case where FIG. 14 (b) is used as the captured image. As shown in FIGS. 15A and 15B, although the photographic subject in the captured image is displaced in the position in the synthetic image because of the camera position displacement, the position of the graphics is not displaced. Therefore, the displacement occurs in the relationship between the graphics and the photographic subject. For example, the position of the cubic obstacle B (cube) with respect to the dashed line which is shown in FIG. 15A is different from the position in FIG. 15B. Thus, the processing for correcting the position to be described hereinafter aims at generating an image as same as FIG. 15A or an image closer to FIG. 15A, even in the case where the captured image in FIG. 14(b) having the camera position displacement is inputted.

Next, the operation of each processing unit in the correction state is described.

In the present first embodiment, an example case is described where the user inputs information to the surroundings monitoring apparatus with the aim of correcting a camera position displacement.

Figure 16A:
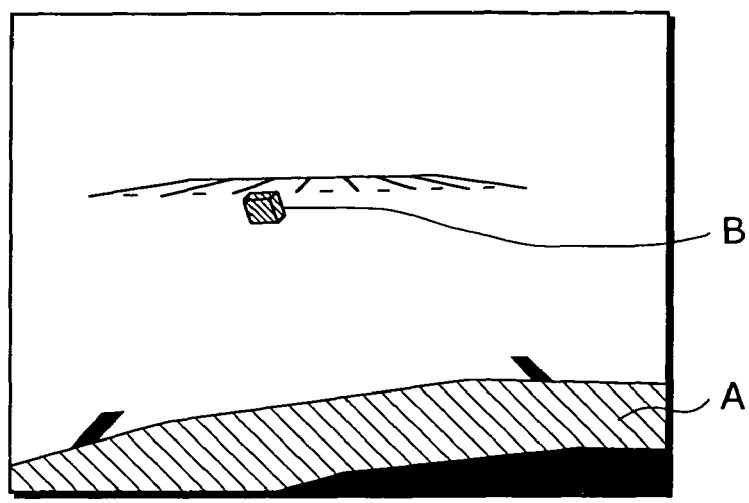
FIG. 16A to FIG. 16C are examples showing a difference between a synthetic image in which the coordinate transformation has been performed and a synthetic image in which the coordinate transformation has not been performed according to the first embodiment of the present invention.
Figure 16B:
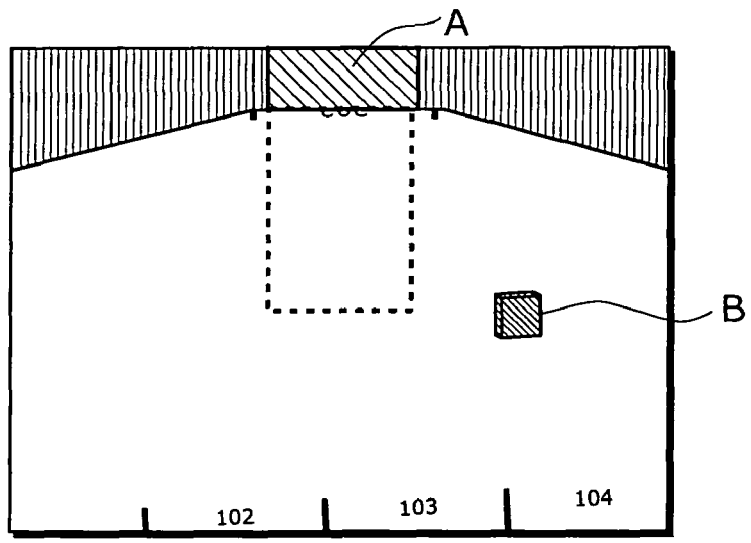
Figure 16C:
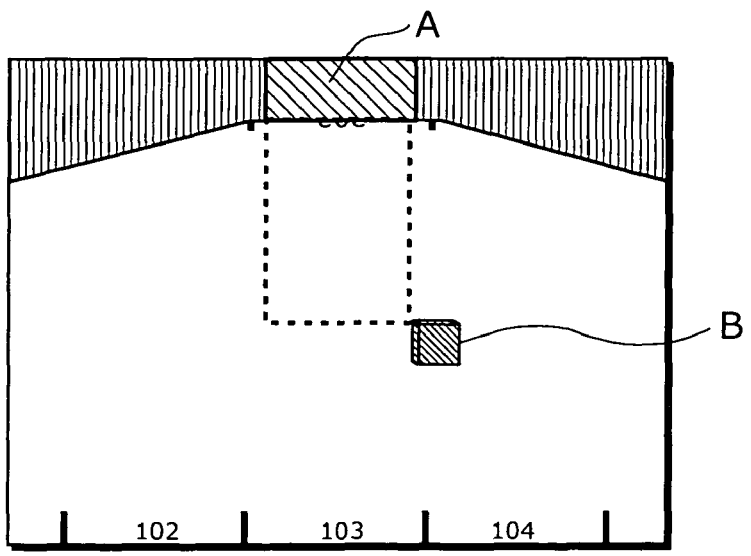

FIG. 16A is an example of a captured image in the case where a camera installation position is displaced by five degrees by rotation to the right direction with respect to the vertical axis. FIG. 16B is a synthetic image with graphics in the case of performing no coordinate transformation, and FIG. 16C is a synthetic image with graphics in the case where coordinate transformation has been performed.

As described above, in the case where the camera position is displaced, the captured image in FIG. 16A is inputted, and the synthetic image with graphics in FIG. 16B is generated and displayed in the display 107 (FIG. 16A and FIG. 14(b), and FIG. 16B and FIG. 15B are respectively the same images).

Here, with the user's manipulation of the switch, an arbitrary camera position displacement Ek is inputted, and the position displacement information obtainment unit 108 receives the camera position displacement Ek. Assume, for example, that the user sequentially inputs Ek as the camera installation position displacement ewyk per degree in the range between −10 to +10 degrees, and stops manipulating the switch when the surrounding condition best matches the synthetic image. Then, in the case where the camera position displacement set by the user is equal to the actual camera position displacement, the image as shown in FIG. 16C is generated.

As described, according to the present first embodiment, a synthetic image is generated, using the transformed image synthesis parameter obtained as a result of performing coordinate transformation depending on the camera position displacement in response to the user's designation. Therefore, even in the case where the captured image with the camera position displacement is used, there is an effect that the displacement between a photographic subject of the synthetic image and the graphics can be reduced. In addition, the present first embodiment produces an effect that recalculation of a reference image synthesis parameter, a transformed image synthesis parameter, a graphics parameter and the like is not required and the calculation load in execution is small even when a camera position displacement occurs.

Figure 17A:
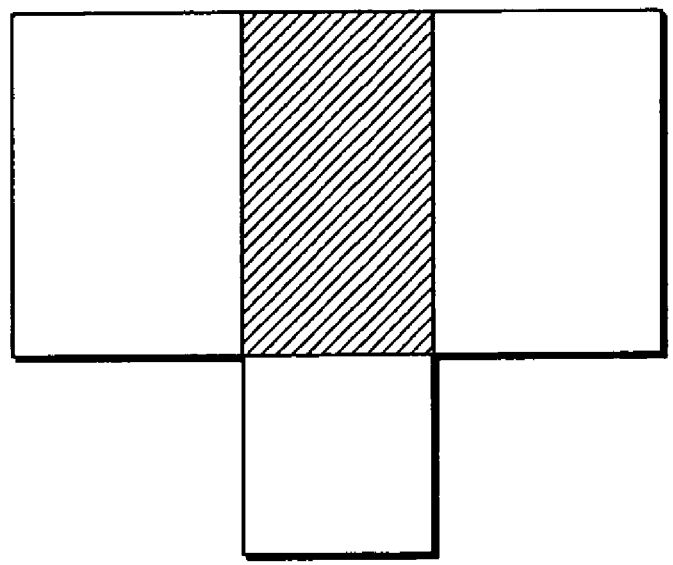
FIG. 17A and FIG. 17B are diagrams showing an example of a use situation in the case where the reference graphics are used according to the first embodiment of the present invention.
Figure 17B:
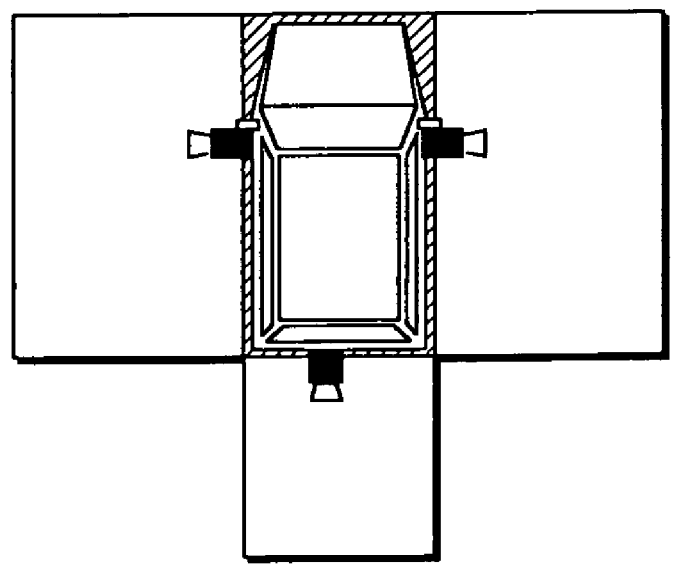
Figure 18A:
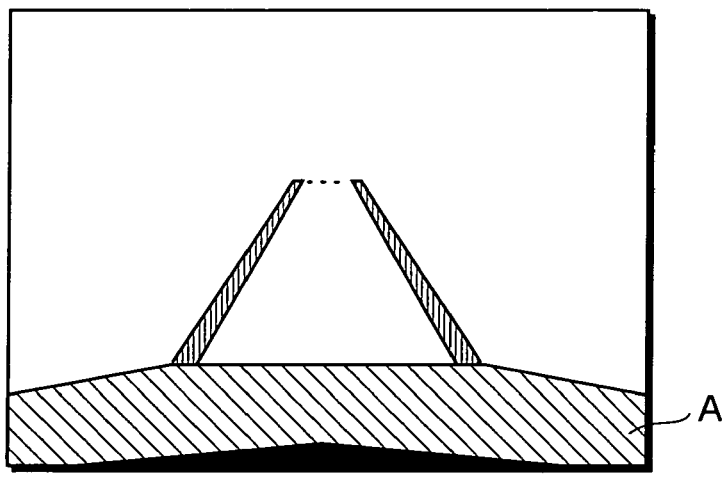
FIG. 18A to FIG. 18C are diagrams showing an example of captured images in the case where the reference graphics are used according to the first embodiment of the present invention.
Figure 18B:
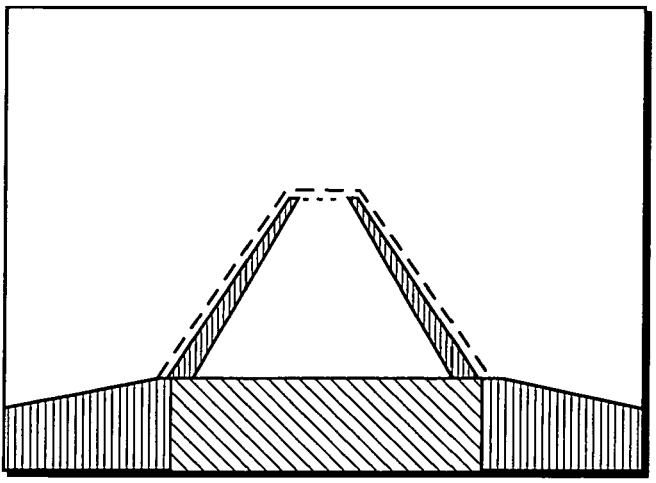
Figure 18C:
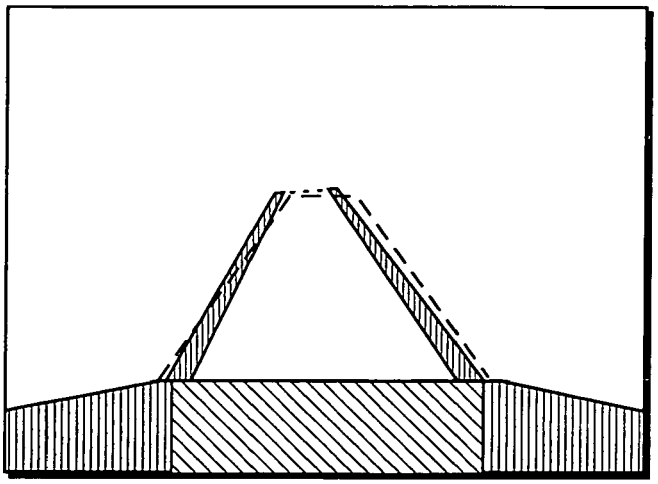

According to the description of the present first embodiment, the user inputs the camera position displacement E while monitoring the image as shown in FIGS. 16A to 16C under the scene of FIG. 3. However, in a scene where there is neither graphics nor an object which serves as a relative position with respect to the vehicle as shown in FIG. 3, there is a case when the user has difficulties in selecting the camera position displacement E. Thus, for example, simple graphics which serves as a reference for the camera position displacement is rendered on the road as shown in FIG. 17A, and after the user parks the vehicle in the particular position on the graphics as shown in FIG. 17B, the user can easily designate the position displacement E by monitoring the image. For example, FIG. 18A is an example of an image captured by the camera 1 under the surrounding condition of FIG. 17B in the case where there is no camera position displacement. FIG. 18B is an example in the case where the same graphics as the graphics on the road in FIGS. 17A and 17B are generated by the graphics synthesis unit 105, and in the case where there is no camera position displacement, the generated graphics (shown by a dashed line) corresponds to the graphics on the road in the captured image. In contrast, in the case where the camera position displacement is present, the graphics on the road is displaced from the position of the generated graphics as shown in FIG. 18C. When the user monitors this image, it is possible to easily understand that the camera position is displaced to the right direction. As a result, it becomes easy for the user to select the camera position displacement E.

Figure 19A:
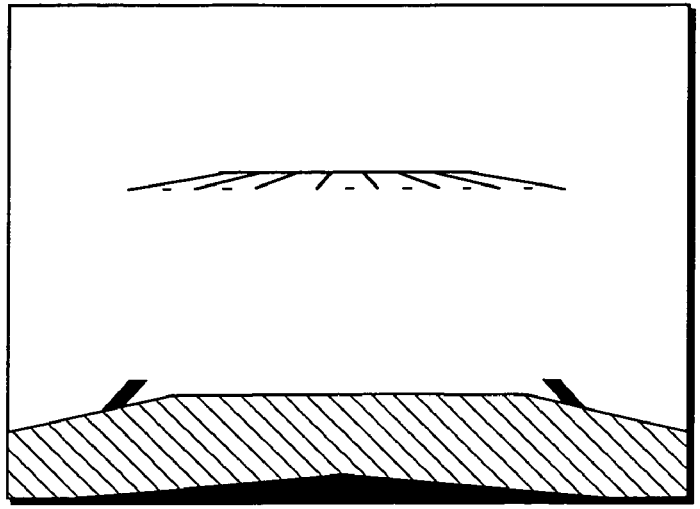
FIG. 19A to FIG. 19C are diagrams showing an example of captured images in the case where recording processing is performed on a synthetic image according to the first embodiment of the present invention.
Figure 19B:
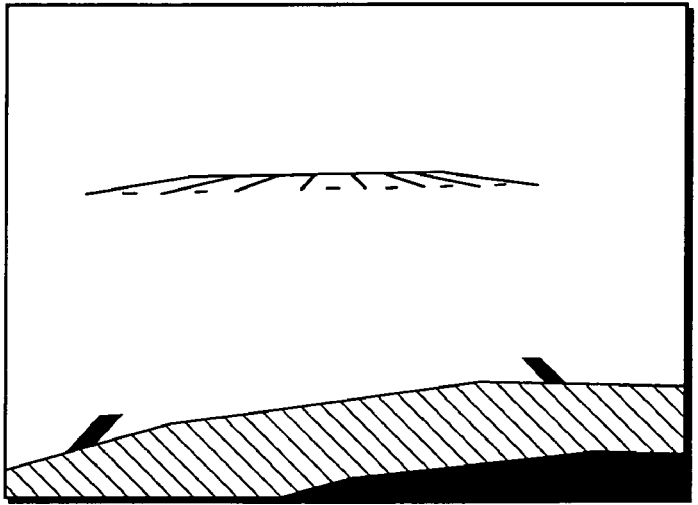
Figure 19C:
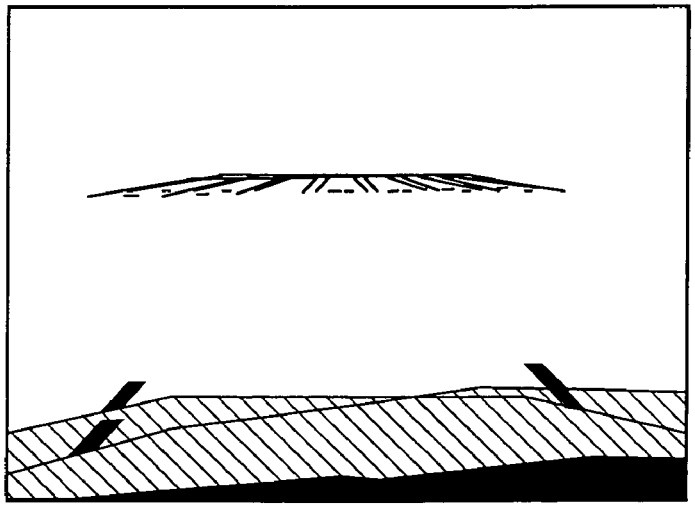

However, with the aforementioned technique, for example, in the case where the user is the buyer of the vehicle and corrects the camera position which has been displaced after purchasing the vehicle, the problem arises that graphics for correcting the position displacement as shown in FIG. 17A is required. In view of this, instead of using the graphics for correcting a position displacement, the graphic synthesis unit 105 may selectively perform, according to the manipulation by the user, processing of recording the synthetic image inputted from the image synthesis unit 104 or processing of superimposing the recorded synthetic image on the synthetic image inputted from the image synthesis unit 104 and outputting the resulting image, in addition to the aforementioned processing. Then, the user records, for example, a synthetic image shown in FIG. 19A in the graphic synthesis unit 105 at the parking lot and the like immediately after purchasing the vehicle, for example. Then, in the case where the camera position displacement occurs, the synthetic image shown in FIG. 19B is generated. In such a case, by superimposing the synthetic image recorded in the graphic synthesis unit 105 on the synthetic image of FIG. 19B and displaying the image as shown in FIG. 19C, the user can easily select the camera position displacement E.

In addition, in the present first embodiment, in order to simplify the description, it is assumed that the camera position displacement E is composed of only ewy, which is one of the parameters indicating a camera installation position displacement, and the parameter is inputted by the user. However, a combination of all or any of the six parameters (ex, ey, ez, ewx, ewy, ewz) indicating the camera installation position displacement Ee and three parameters (eyc, ewxc, ewzc) indicating the location displacement Ec of the vehicle may be used. Furthermore, the location displacement Ec of the vehicle may be obtained by a detection unit which is a combination of an acceleration sensor which detects a location of the vehicle, an angular acceleration sensor and the like.

In addition, in the present first embodiment, it is assumed that the user designates the optimal camera position displacement E by inputting the arbitrary camera position displacement E into the position displacement information obtainment unit 108, while monitoring the synthetic image. However, the first embodiment is not limited to this method. For example, by performing the camera calibration, the camera position displacement may be calculated and the calculated value may be inputted.

In addition, in the present first embodiment, the coordinate transformation parameter obtainment unit 120 includes the coordinate transformation parameter selection unit 110 and coordinate transformation parameter storage unit 111, and the coordinate transformation parameter selection unit 110 selects one of the coordinate transformation parameters stored in the coordinate transformation parameter storage unit 111 according to the camera position displacement information. However, the present invention is not limited to this. For example, the coordinate transformation parameter obtainment unit 120 may generate a coordinate transformation parameter based on the camera position displacement information.

In addition, in the present first embodiment, the coordinate transformation unit 112 uses projective transformation. However, the coordinate transformation method is not limited to the projective transformation. Any coordinate transformation may be used, as long as such transformation has an effect of correcting the camera position displacement.

Second Embodiment

FIG. 20 is a block diagram showing the configuration of the surroundings monitoring apparatus according to the second embodiment of the present invention.

The present embodiment differs from the first embodiment in the details of a coordinate transformation parameter P stored in the coordinate transformation parameter storage unit 212 and the operations of the coordinate transformation parameter selection unit 211 and coordinate transformation unit 201.

The operation of each unit is described hereinafter.

The coordinate transformation unit 201 of the present second embodiment performs coordinate transformation on the image coordinates of the captured image included in the reference image synthesis parameter outputted from the image synthesis parameter selection unit 221 by using the coordinate transformation parameter outputted from the coordinate transformation parameter selection unit 212 according to the affine transformation using Equation 2 indicated below, and outputs the resulting image coordinates as a transformed image synthesis parameter.

$$x_i' = ax_i + by_i + c,$$ (Formula 2)

$$y_i' = dx_i + ey_i + f$$ (Equation 2)

The coordinate transformation parameter is composed of six coefficients (a, b, c, d, e, f) in Equation 2.

The coordinate transformation parameter stored in the coordinate transformation parameter storage unit 212 is a coordinate transformation parameter P (E, q, r, k) which is calculated beforehand depending on the camera position displacement E, reference image synthesis parameter number q, graphics parameter number r, and camera number k.

The coordinate transformation parameter selection unit 211 selects and outputs the coordinate transformation parameter P (E, q, r, k) which corresponds to the position displacement E for each camera which is included in the camera position displacement information, camera number k, the reference image synthesis parameter number p selected in the image synthesis parameter selection unit 221 and graphics parameter number r. The reference image synthesis parameter number p and the graphics parameter number r are obtained with the selection method shown in FIG. 10 based on the moving object state inputted from the moving object state detection unit 109.

An example of the method for calculating the coordinate transformation parameter P (E, q, r, k) is described hereinafter. As in the case of the method of obtaining the coordinate transformation parameter by projective transformation in the first embodiment, the coordinate transformation parameter is calculated from a plurality of coordinates which indicate corresponding points between a captured image without a position displacement and a captured image with a certain position displacement E. The different point from the first embodiment is to calculate a coordinate transformation parameter, using a different corresponding point depending on the camera number k, the reference image synthesis parameter number p and the graphics parameter number r.

Figure 21A:
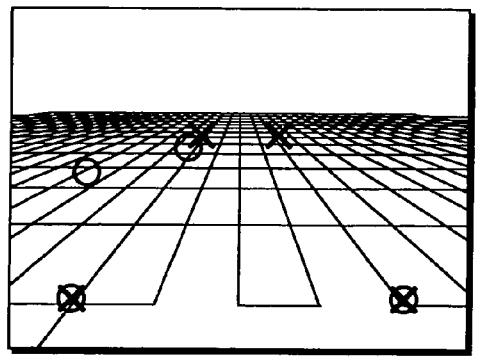
FIG. 21A to FIG. 21D are diagrams showing an example of synthetic images in the case where affine transformation is used as the coordinate transformation according to the second embodiment of the present invention.
Figure 21B:
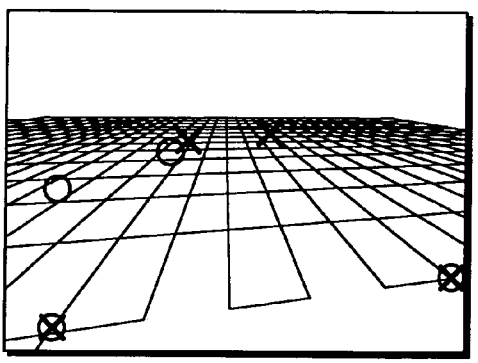

Assume that the image captured in the reference camera position is FIG. 21A, and that the captured image in the case where the camera position displacement is E is FIG. 21B. Also assume that the image coordinates on the captured image without a camera position displacement is (xi, yi) and the image coordinates on the image with position displacement is (xi', yi'), and that there is a relationship of Equation 2 between the respective image coordinates. In this case, by providing three or more corresponding points on the image, it is possible to calculate a coordinate transformation parameter so as to obtain a minimal square error in Equation 2.

The "circle marks" and "x marks" in FIGS. 21A and 21B respectively indicate a set of four corresponding points, and those points are provided as points on the captured image which is on the dashed line of the image generated by the graphics parameter 2-2 which generates graphics shown in FIG. 9C and the graphics parameter 2-1 which generates graphics shown in FIG. 9B. Then, the coordinate transformation parameter is calculated for each set of the corresponding points.

Here, a corresponding point of the "x mark" and a corresponding point of the "circle mark" are points on the captured image respectively corresponding to the graphics parameter 2-2 and graphics parameter 2-1. In addition, as the graphics parameter 2-1 and graphics parameter 2-2 are selected by the selection method in FIG. 10, it is assumed that the coordinate transformation parameter calculated using a corresponding point of the "x mark" is a coordinate transformation parameter P (E, 2, 2-2,1) in the case of "camera position displacement E, reference image synthesis parameter 2, graphics parameter 2-2, camera 1", and that the coordinate transformation parameter calculated using a corresponding point of the "circle mark" is a coordinate transformation parameter P (E, 2, 2-1, 1) in the case of "camera position displacement E, reference image synthesis parameter 2, graphics parameter 2-1, camera 1".

Figure 21C:
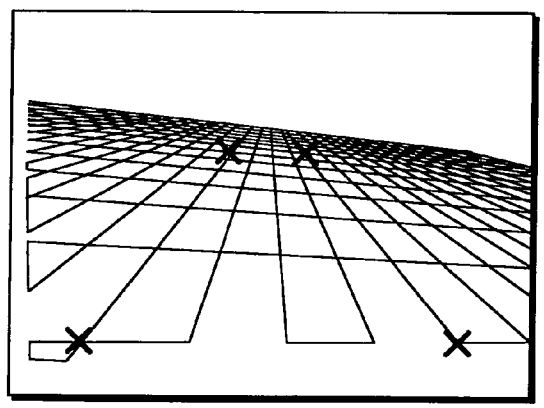
Figure 21D:
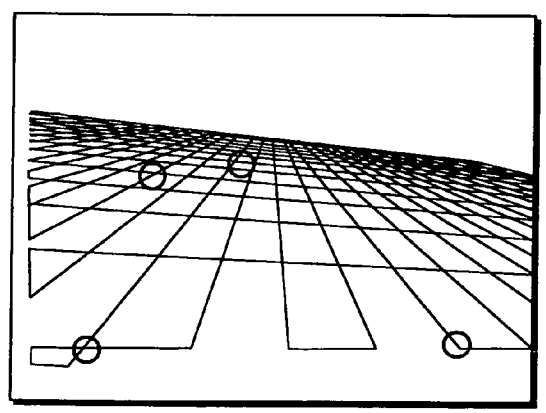

FIGS. 21C and 21D are examples of synthetic images generated by performing coordinate transformation using the captured image with the camera position displacement in FIG. 21B and using the aforementioned two coordinate transformation parameters. The affine transformation can completely correct the displacement in a captured image as long as the camera position displacement is limited to rotation of the camera with respect to the Z axis. However, the camera position displacement caused by other types of rotation and translation can not be completely corrected. The affect of this position displacement is expected to be minimal in the positions of the corresponding points used for calculating the aforementioned coordinate transformation parameters. In other words, in the respective positions of corresponding points of the "x mark" and corresponding points of the "circle mark", the synthetic images of FIGS. 21C and 21D are synthetic images with less position displacements caused by the camera position displacement.

Figure 22A:
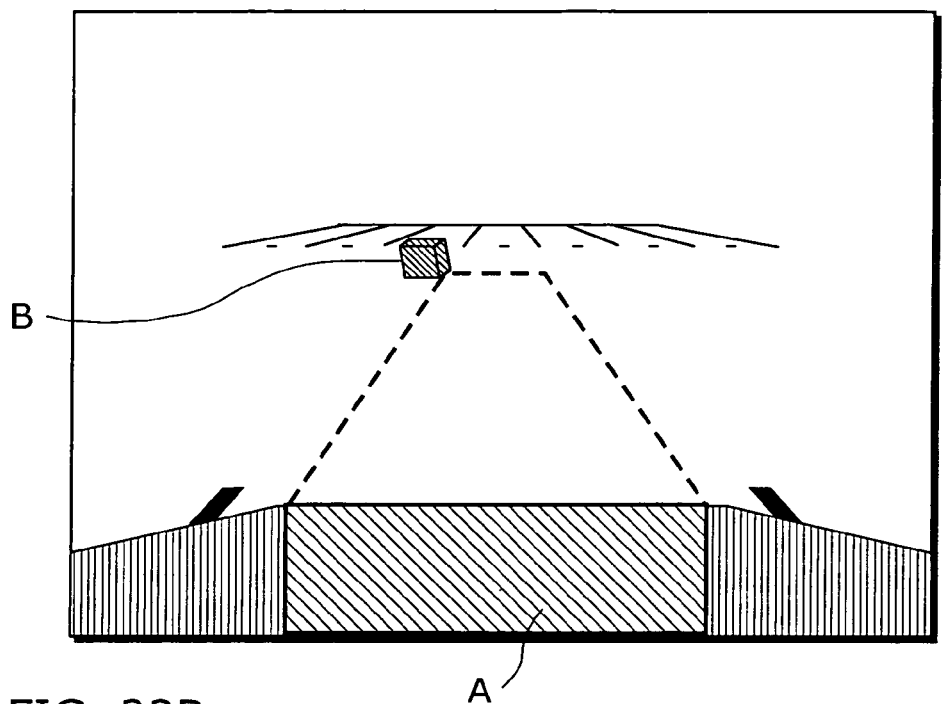
FIG. 22A and FIG. 22B are diagrams showing an example of synthetic images in the case where a position of the camera is displaced according to the second embodiment of the present invention.
Figure 22B:
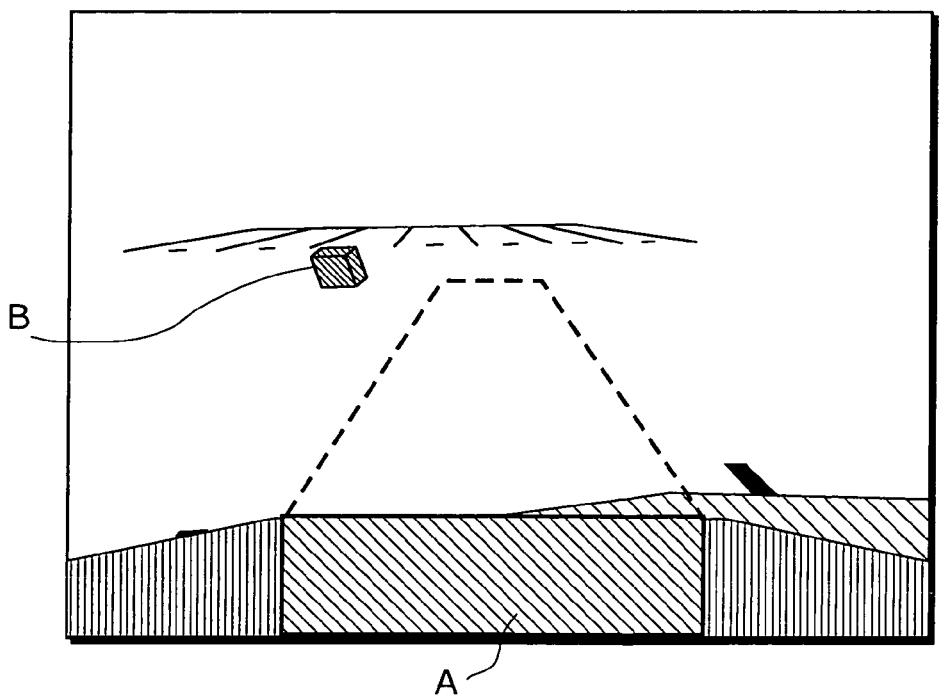
Figure 23A:
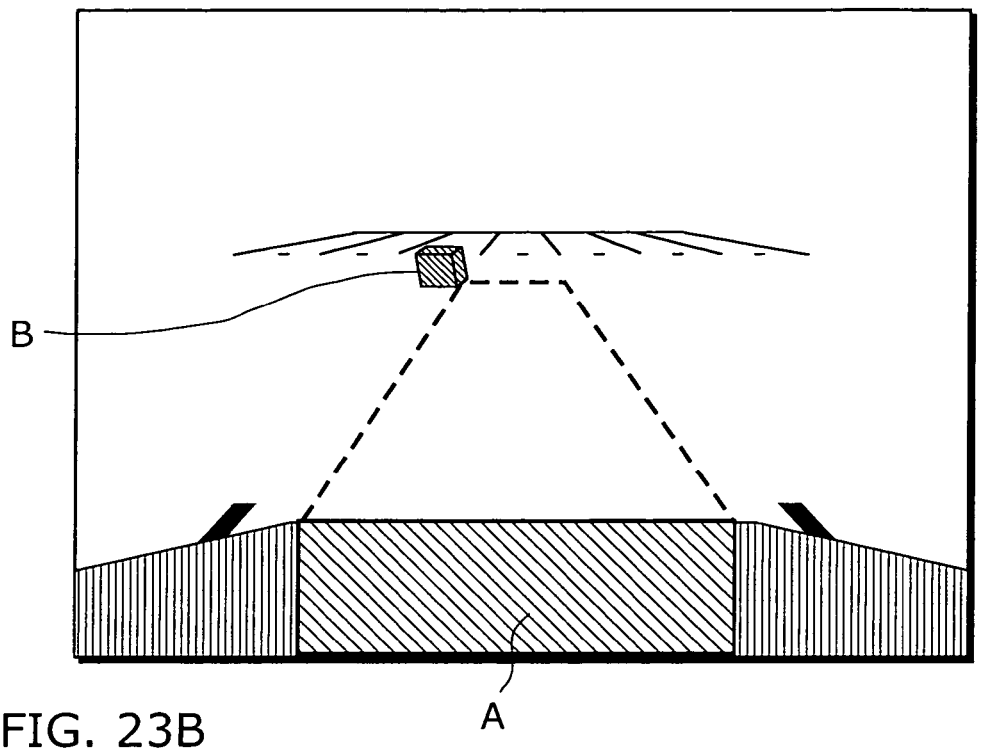
FIG. 23A and FIG. 23B are diagrams showing an example of synthetic images on which graphics is superimposed according to the second embodiment of the present invention.
Figure 23B:
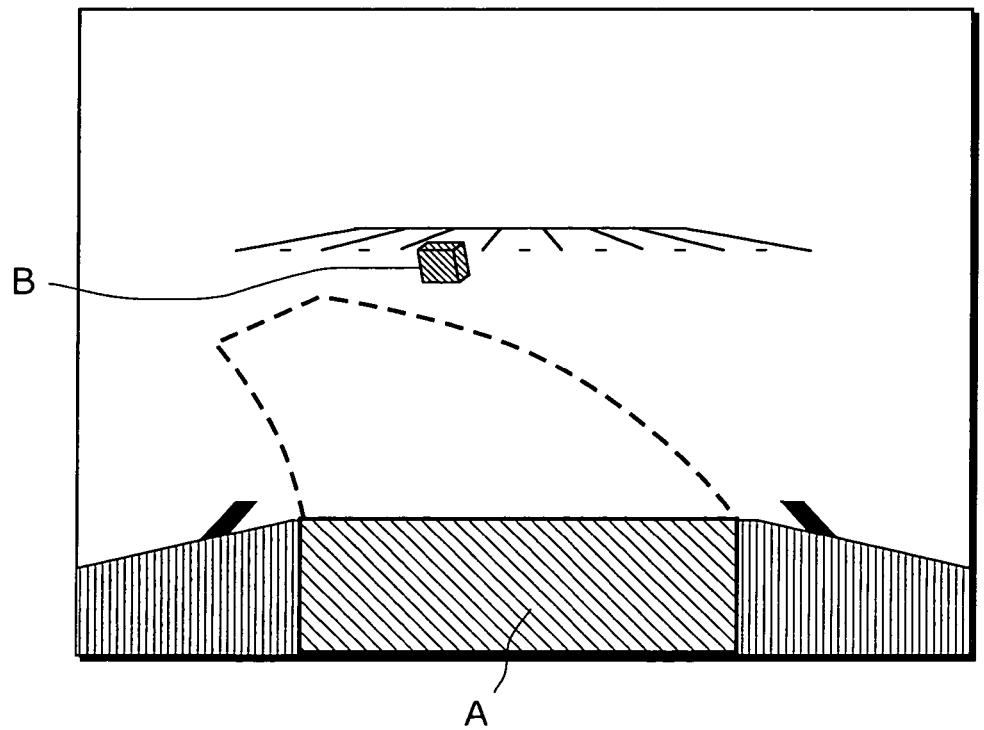

Example images are shown which are generated by the operations of the aforementioned coordinate transformation parameter selection unit 211, coordinate transformation unit 201 and each processing unit using the coordinate transformation parameter generated by the aforementioned method. FIGS. 22A and 22B are examples of synthetic images with graphics in the case where the images are captured under the surrounding condition of FIG. 2, the moving object state is that "the vehicle is moving, the shift lever is placed in R, and the steering is in a neutral position", and the user inputs ewyk=0 as an initial value of the camera position displacement E. FIG. 22A is a synthetic image with graphics in the case where there is no camera position displacement, and FIG. 22B is a synthetic image with graphics in the case where a camera position displacement is present. FIG. 23A is an example of a synthetic image with graphics in the case where a preferable camera position displacement E is inputted through the manipulation of the user as in the first embodiment, in other words, a synthetic image with graphics obtained by performing the coordinate transformation using the aforementioned coordinate transformation parameter P (E,2,2-2,1). Whereas there is a relationship of a position displacement between a photographic subject (an obstacle in particular) and graphics in FIG. 22B, the displacement is reduced in FIG. 23A. Furthermore, in the case where the moving object state has become a state that "the vehicle is moving, the shift lever is placed in R, and the steering is in a right position" as a result of a manipulation of the user, the graphics parameter 2 is used in the graphics synthesis unit 105, and the coordinate transformation parameter P (E,2,2-1, 1) is used in the coordinate transformation unit 112 so as to generate the synthetic image with graphics in FIG. 23B.

As described above, in the case where affine transformation is used in the coordinate transformation unit 201, the error in the proximity of the corresponding points which are used for calculating the coordinate transformation parameter is reduced. In other words, concerning the synthetic images with graphics shown in FIGS. 23A and 23B, the synthetic images are generated in which the position displacement after the coordinate transformation is minimal in the position of the dashed line in the image. In the case where the user monitors such a synthetic image, as the position displacement is less in parts where position relationship is important, such as a relationship in the synthetic image between an obstacle and a dashed line or graphics of the vehicle which is used as a reference position, it is possible to understand more accurate position relationship.

As described above, in the present second embodiment, the coordinate transformation parameter obtainment unit 210 performs coordinate transformation on the reference image synthesis parameter suitable for the graphics superimposed on the synthetic image by generating the coordinate transformation parameter suitable for the graphics superimposed in the graphics synthesis unit 105. Therefore, there is an effect that an image with a less displacement between the graphics and synthetic image can be displayed.

In addition, in the present second embodiment, as the coordinate transformation unit 201 performs coordinate transformation using affine transformation, there is also an effect that the calculation load is small compared to the case where projective transformation is used.

Although the case where a different coordinate transformation parameter is used depending on graphics parameter is described in the present second embodiment, any combination may be used as long as the coordinate transformation parameter is composed of a combination of a camera position displacement, a reference image synthesis parameter, a graphics parameter, and camera number, and a different coordinate transformation parameter may be used depending on the reference image synthesis parameter. For example, as the areas of captured images which are used to generate each of the synthetic images are different between the reference synthesis image parameter 1 which generates the synthetic image shown in FIG. 8A and the reference image synthesis parameter 2 which generates the synthetic image shown in FIG. 8B, even when the synthetic images are generated by the images captured by the same camera 1. Therefore, when obtaining a coordinate transformation parameter, for example, by providing the corresponding points suitable for the area of the captured image, there is an effect that it is possible to generate a synthetic image with a less position displacement suitable for the composition of the reference image synthesis parameter.

Figure 24A:
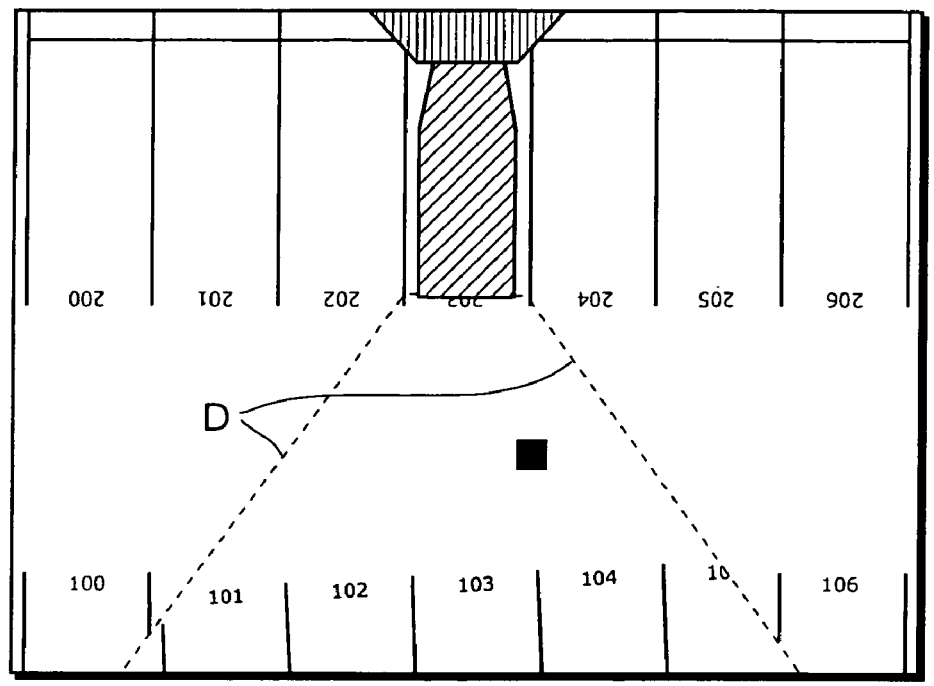
FIG. 24A and FIG. 24B are diagrams showing an example of synthetic images using a plurality of cameras according to the second embodiment of the present invention.
Figure 24B:
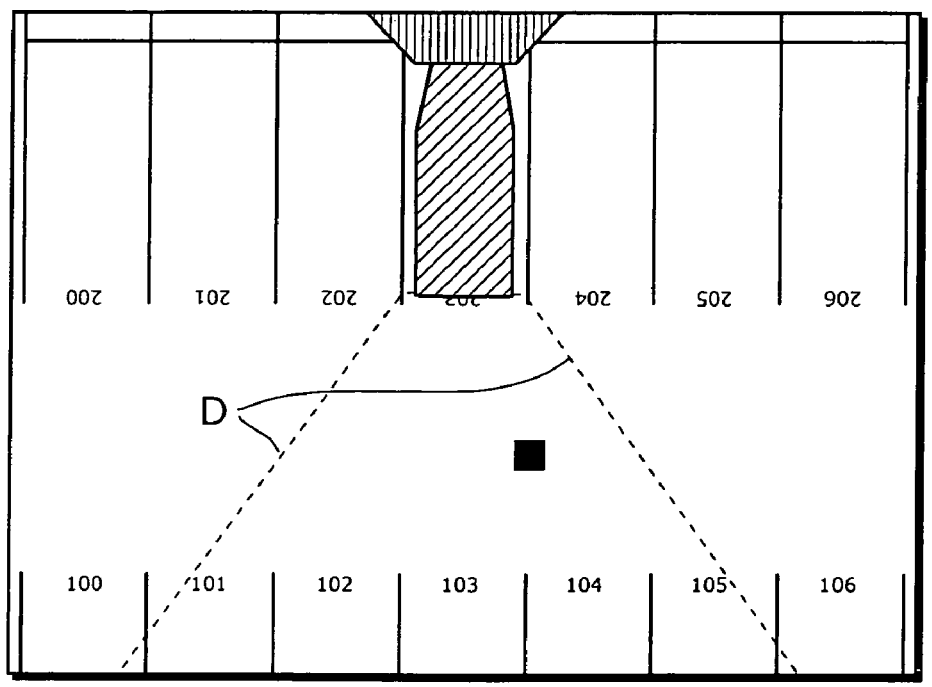

In addition, in a composition in which a synthetic image is generated from three images, as in the case of the reference image synthesis parameter 3 which generates the synthetic image shown in FIG. 8C, when the position of a single camera is displaced, the captured image becomes unnatural in which a camera boundary part D in the synthetic image as shown in FIG. 24A becomes discontinuous. Thus, when calculating a coordinate transformation parameter corresponding to the reference image synthesis parameter with the composition in which a plurality of images are connected, a corresponding point is given, as a corresponding point for calculating the coordinate transformation parameter, to the position in the captured image corresponding to the camera boundary part D in the synthetic image so as to reduce the position displacement in the camera boundary part D. By using the coordinate transformation parameter obtained in the above manner, there is an effect that a synthetic image with a less position displacement in the camera boundary part D as shown in FIG. 24B can be generated and a synthetic image which is less unnatural to the user can be generated.

Moreover, in the present second embodiment, although the coordinate transformation unit 201 performs coordinate transformation using the affine transformation, the coordinate transformation method is not limited to the affine transformation, and as long as the coordinate transformation is effective at correcting the camera's position displacement, any transformation can be used. For example, even in the case of using the projective transformation or transformation indicated by Equation 3, Equation 4 or the like, when an image is captured by the camera with a distorted lens and the camera position displacement includes a translation component, the position displacement remains in the synthetic image in which the coordinates are transformed. Then, as the position displacement in the synthetic image is reduced in the position of the corresponding points used for calculating the coordinate transformation parameter, likewise in the present second embodiment, by using the coordinate transformation parameter according to the graphics, it is possible to generate a synthetic image with less position displacement effect in the synthetic image.

$$x'_i = \frac{ax_i + by_i + c}{hy_i + 1}$$

$$y'_i = \frac{dx_i + ey_i + f}{gx_i + 1}$$

Equation 3

$$x'_i = (ax_i + by_i + c)(ky_i + 1)$$

$$y'_i = (dx_i + ey_i + f)(lx_i + 1)$$

Equation 4

Third Embodiment

In the present third embodiment, the configuration and operation are the same as the second embodiment, and different points from the second embodiment are that the cameras 101 are cameras which output images captured with distorted lenses, and that the cameras 101 having the distorted lenses are used, in each of which the position error within the range of the predetermined camera position displacement and the range of the reference image synthesis parameter is minimal after performing coordinate transformation.

Figure 25A:
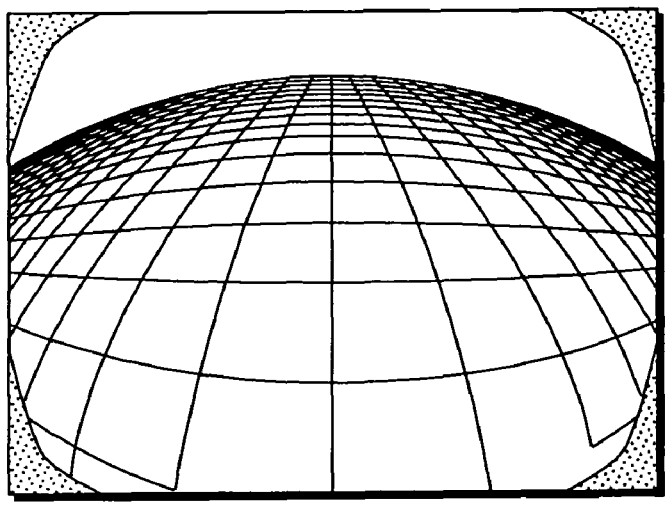
FIG. 25A to FIG. 25C are diagrams showing an example of synthetic images in the case where a captured image with lens distortion is used according to the third embodiment of the present invention.
Figure 25B:
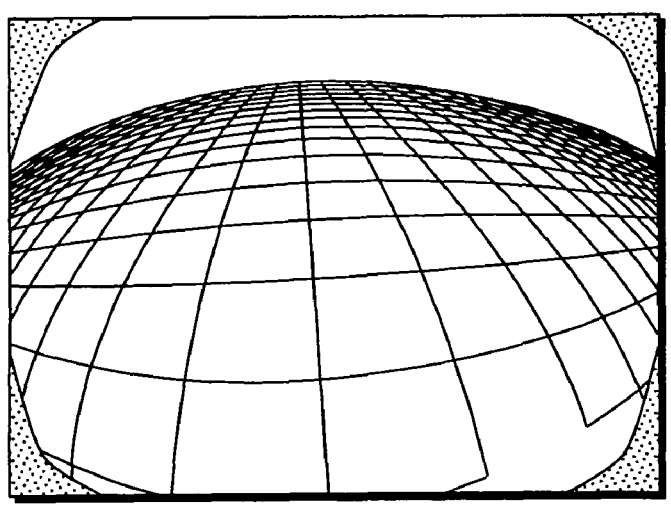
Figure 25C:
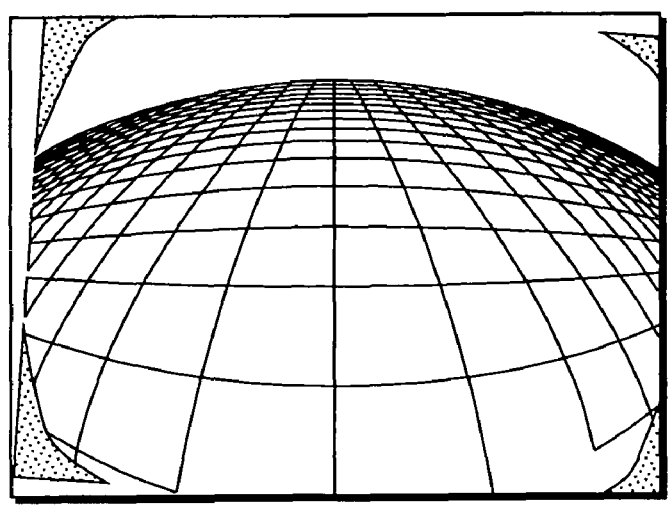

FIGS. 25A to 25C are diagrams showing examples of the captured images using the distorted lenses, and the synthetic images generated according to the same operation as the second embodiment. FIG. 25A is an example of a captured image in the case where the camera 101 outputs the image using the distorted lens, and FIG. 25B is an example of a captured image in the case where the camera position is displaced. In the present third embodiment, as in the case of the second embodiment, a coordinate transformation parameter is obtained beforehand from a captured image without a camera position displacement and images with position displacements of plural cameras which can be obtained in the possible range of the camera position displacement E, and the synthetic image as shown in FIG. 25C is generated by performing coordinate transformation using the obtained coordinate transformation parameter.

Figure 26A:
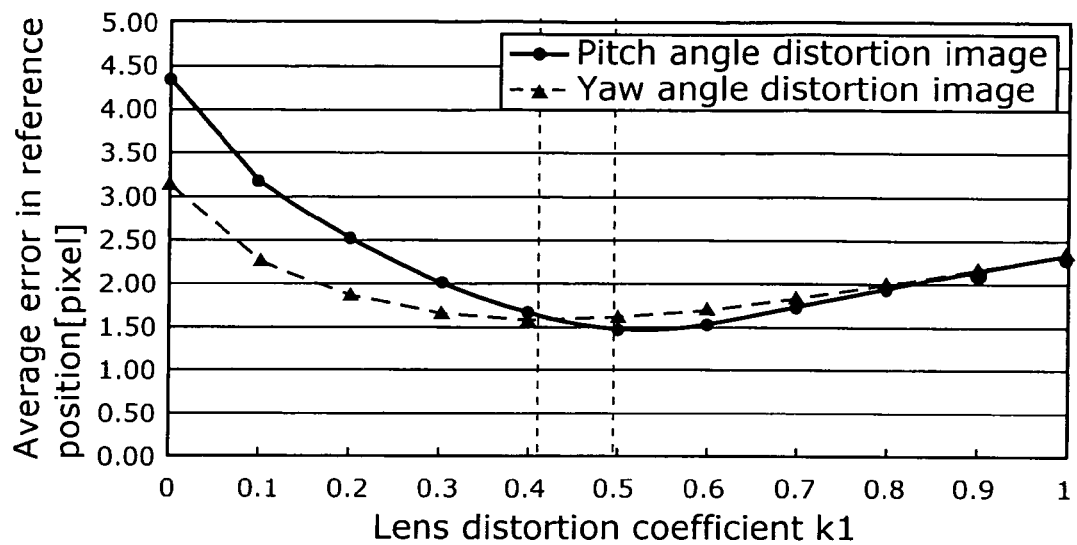
FIG. 26A and FIG. 26B are graphs showing a position error on the synthetic image in the case where the coordinate transformation is performed on a captured image with lens distortion according to the third embodiment of the present invention.
Figure 26B:
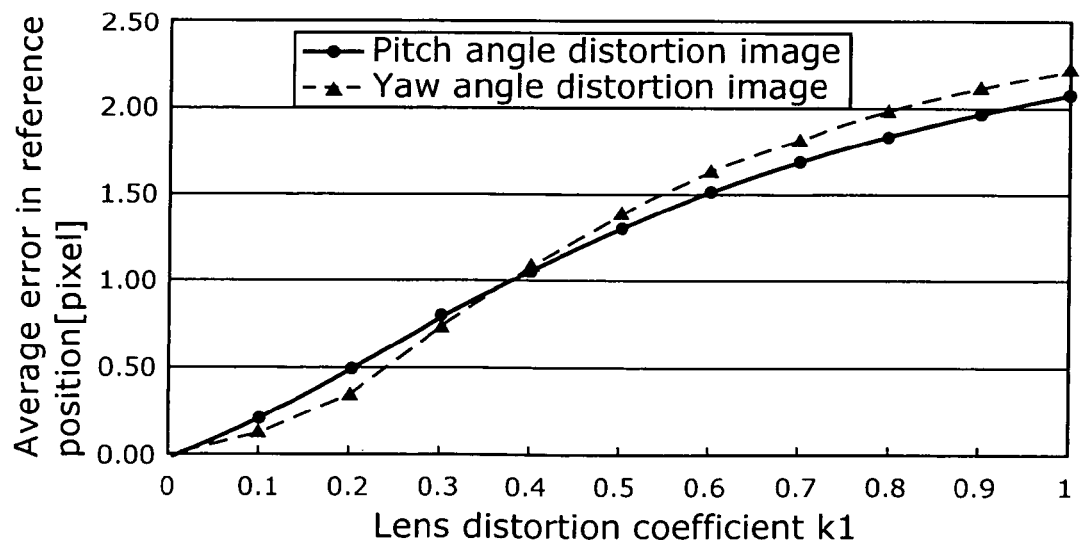

In this case, it has been verified by the experiment conducted by the inventors of the present invention that when the degree of lens distortion changes under the same conditions of the camera position displacement, reference image synthesis parameter, graphics parameter, and camera number, the degree of position displacement in the synthetic image after performing coordinate transformation also changes. FIGS. 26A and 26B are diagrams, each of them showing a relationship between the average error and the lens distortion k1 in the case where the coordinate transformation is performed on the image captured using the distorted lens, where FIG. 26A shows the case of using affine transformation, and FIG. 26B shows the case of using projective transformation. These have been obtained by calculating the coordinate transformation parameter of the captured image having the quadratic lens distortion k1, using corresponding relationship between points on the dashed line of the graphics parameter 2-2 in the reference image synthesis parameter 2 and the points on the dashed line of the image captured using distorted lens, and calculating the average error between the captured distorted points on the dashed line and the points on the dashed line of the synthetic image on which coordinate transformation has been performed.

As shown in FIGS. 26A and 26B, in the case of projective transformation, the more the lens becomes distorted, the larger average error becomes, whereas in the case of affine transformation, the average error is minimal when the lens distortion coefficient is 0.4 to 0.5. In other words, this indicates that an average of position displacement on the synthetic image after performing coordinate transformation becomes minimal in the case of using the camera with the lens distortion coefficient of 0.4 to 0.5 under the calculation conditions of FIGS. 26A and 26B including the displacement of the lens position, reference image synthesis parameter, graphics parameter, and camera number. Therefore, there is an effect of generating a synthetic image with a less position displacement by calculating the lens distortion so as to obtain the minimal average position displacement of the synthetic image obtained by the similar calculation within the possible range of the camera position displacement, and using the camera having such lens distortion.

As described above, according to the present third embodiment, there is an effect of generating a synthetic image with a less position displacement, by using a captured image having a lens distortion parameter which produces the minimal error in the synthetic image generated by one or more predetermined reference image synthesis parameters and one or more predetermined coordinate transformation parameters.

In each embodiment, although it is assumed that the reference image synthesis parameter is composed of image coordinate values of the captured image corresponding to the image coordinates of the synthetic image, image coordinate values out of the area of the captured image may be designated. Even in the case where the image coordinate values out of the area of the captured image are included in the reference image synthesis parameter, there is an effect that the transformed image synthesis parameter on which coordinate transformation is performed in the coordinate transformation unit may be replaced with a coordinate value within the area of the captured image, and the area of the image displayed as a synthetic image can be expanded.

In the same manner, concerning the reference image synthesis parameter which represents a plurality of the captured images as shown in FIG. 8C, in the proximity of the joining areas of the captured images which are used to generate a synthetic image, two or more sets of the coordinates of the captured images may be referred to per single set of the image coordinates in the synthetic image, and the coordinate transformation unit may select and output, as a transformed image synthesis parameter, one of the sets of the image coordinates within the area of the captured image after performing coordinate transformation. In this case, there is an effect that the area of the image displayed as a synthetic image can be expanded.

In addition, in each embodiment, although the moving object state detection unit 108 and the image synthesis parameter selection unit 113 are assumed to use the vehicle speed, shift lever and steering angle as the moving object state, kinds of moving object states and selection methods of a parameter are not limited to them. Any information may be used as long as the moving object state is related to the composition of the synthetic image. For example, road situations may be obtained from obtained position information of the vehicle which has been obtained by a Global Positioning System (GPS) device, and the vehicle location may be estimated based on the road situations. Then, depending on this vehicle location, the reference image synthesis parameter and coordinate transformation parameter may be selected.

In addition, in each embodiment, although it is assumed that the image synthesis parameter selection unit 113 selects a reference image synthesis parameter according to the selection method in FIG. 10, the selection methods in the present invention are not limited to the aforementioned selection method, and any selection method may be used.

In addition, in each embodiment, although it is assumed that three cameras are present and the installation position and the captured area are the ones described in FIG. 3, the number of cameras, installation position, and the captured area are not limited to the aforementioned scope.

In addition, in each embodiment, although it is assumed that the vehicle in which a plurality of cameras and the surroundings monitoring apparatus are installed is described as a four-wheel vehicle, the vehicle type is not limited, and moving objects such as a two-wheel vehicle, a three-wheel vehicle and a robot may also be used. Furthermore, a place where a plurality of cameras and the surroundings monitoring apparatus are installed is not limited to the moving objects, and such cameras and apparatus may be fixed and installed, for example, in a station, a building, or the like. In addition, a plurality of cameras and the surroundings monitoring apparatus need not to be installed in the same moving object or place, and the cameras and the surroundings monitoring apparatus may be installed separately in a different place.

Figure 27:
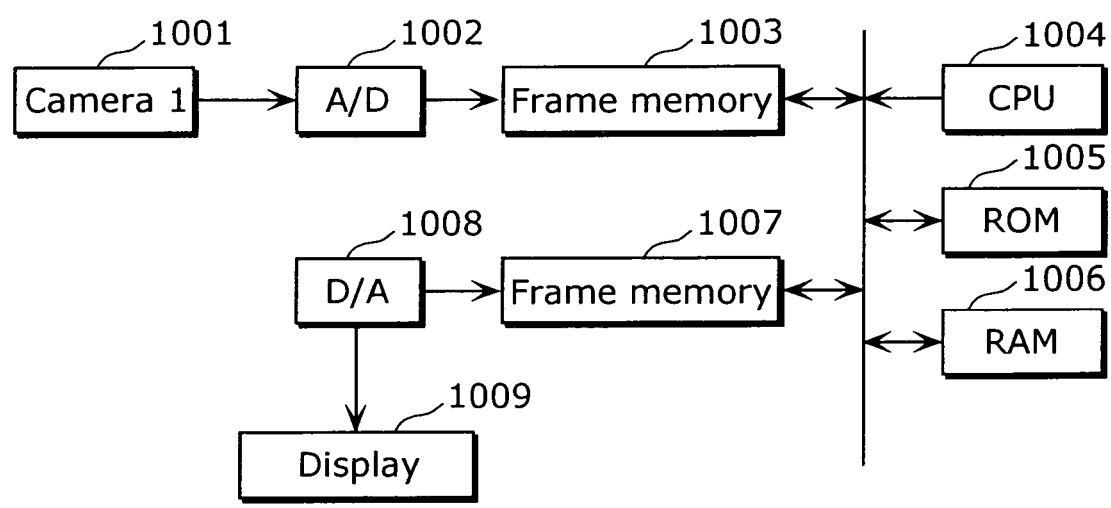
FIG. 27 is a block diagram showing the configuration in the case where the surroundings monitoring apparatus according to the present invention is configured by a computer.

In addition, in the embodiments of the present invention, although it is described that each processing unit is implemented by individual hardware, each processing unit may be included in a single IC and the like, or it may be implemented by software executed in a computer provided with an input and output unit for images as shown in FIG. 27 (CPU 1004, ROM 1005, RAM 1006, and the like), and thereby the same effect as the embodiments of the present invention can be obtained.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

The surroundings monitoring apparatus according to the present invention is capable of correcting, in a displayed image, distortions caused by a camera position displacement, and is useful as a surroundings monitoring apparatus which can assist operations of moving objects, such as driving a vehicle and remotely controlling a robot. In particular, it is useful as a surroundings monitoring apparatus which generates and displays a synthetic image as if it were captured from a virtual viewpoint, using images captured by a plurality of cameras. In addition, the present invention can be applied to a monitoring apparatus aimed at security and an image synthesis device aimed at creating video.

What is claimed is:

1. A surroundings monitoring apparatus which generates a surrounding image using an image captured by a camera, the surroundings monitoring apparatus comprising:
a position displacement information obtainment unit operable to obtain position displacement information which is information regarding a displacement in a position of the camera;
a coordinate transformation parameter obtainment unit operable to obtain, based on the position displacement information obtained by the position displacement information obtainment unit, a coordinate transformation parameter for correcting a distortion in the surrounding image caused by the displacement in the position, the coordinate transformation parameter defining a function for transforming two-dimensional coordinates of one pixel into two-dimensional coordinates of another pixel;
an image synthesis parameter obtainment unit operable to obtain at least one reference image synthesis parameter which is used for generating the surrounding image using the captured image, the at least one reference image synthesis parameter including information of image coordinates indicating, on the captured image, a pixel position corresponding to each pixel in the surrounding image, and the image coordinates being two-dimensional coordinates;
a coordinate transformation unit operable to perform coordinate transformation on the two-dimensional image coordinates included in the at least one reference image synthesis parameter obtained by the image synthesis parameter obtainment unit, using the coordinate transformation parameter obtained by the coordinate transformation parameter obtainment unit, and to output the image coordinates as a transformed image synthesis parameter indicating transformed two-dimensional image coordinates; and
an image synthesis unit operable to generate the surrounding image by applying the transformed image synthesis parameter to the captured image, and to output the generated surrounding image,
wherein the image synthesis unit is operable to read, from among pixels included in the captured image, an image of a pixel located in the transformed two-dimensional image coordinates indicated by the transformed image synthesis parameter, and to output the read image as an image of a pixel located in the surrounding image and corresponding to the pixel located in the transformed two-dimensional image coordinates.

2. The surroundings monitoring apparatus according to claim 1,
wherein the coordinate transformation parameter obtainment unit includes:
a coordinate transformation parameter storage unit operable to store at least one coordinate transformation parameter beforehand, and
a coordinate transformation parameter selection unit operable to select a coordinate transformation parameter from the at least one coordinate transformation parameter based on the position displacement information obtained by the position displacement information obtainment unit.

3. The surroundings monitoring apparatus according to claim 1,
wherein the coordinate transformation parameter obtainment unit is operable to generate the coordinate transformation parameter based on the position displacement information obtained by the position displacement information obtainment unit, and obtain the generated coordinate transformation parameter as the coordinate transformation parameter for correcting distortion.

4. The surroundings monitoring apparatus according to claim 1, further comprising:
a graphics synthesis unit operable to superimpose graphics on the surrounding image generated by the image synthesis unit, and to output the image superimposed with graphics,
wherein the coordinate transformation parameter obtainment unit is operable to obtain the coordinate transformation parameter based on the position displacement information obtained by the position displacement information obtainment unit and the graphics superimposed by the graphics synthesis unit.

5. The surroundings monitoring apparatus according to claim 4,
wherein the coordinate transformation parameter obtainment unit is operable to obtain a coordinate transformation parameter in which a position error of the surrounding image after the coordinate transformation is minimal in a predetermined position of the graphics superimposed by the graphics synthesis unit.

6. The surroundings monitoring apparatus according to claim 1,
wherein the image synthesis parameter obtainment unit includes:
an image synthesis parameter storage unit operable to store the at least one reference image synthesis parameter beforehand, and
an image synthesis parameter selection unit operable to select a reference image synthesis parameter from the at least one reference image synthesis parameter.

7. The surroundings monitoring apparatus according to claim 6, further comprising:
a state detection unit operable to detect a state of a moving object including information regarding a location of the moving object which is equipped with the surroundings monitoring apparatus,
wherein the image synthesis parameter selection unit is operable to select one of the at least one reference image synthesis parameters based on the moving object state detected by the state detection unit.

8. The surroundings monitoring apparatus according to claim 6,
wherein the coordinate transformation parameter obtainment unit is operable to obtain the coordinate transformation parameter based on the position displacement information obtained by the position displacement information obtainment unit and the reference image synthesis parameter selected by the image synthesis parameter selection unit.

9. The surroundings monitoring apparatus according to claim 1,
wherein the reference image synthesis parameter includes information of the image coordinates for a part of the captured image corresponding to the surrounding image, and
the coordinate transformation parameter obtainment unit is operable to obtain a coordinate transformation parameter in which a position error of the surrounding image after the coordinate transformation is minimal in a predetermined position for the part of the captured image.

10. The surroundings monitoring apparatus according to claim 1,
wherein the reference image synthesis parameter includes plural pieces of information of image coordinates for a plurality of the captured images, the information being used for generating the surrounding image using a plurality of the images captured by plural cameras,
the position displacement information obtainment unit is operable to obtain plural pieces of the position displacement information which are respective pieces of information regarding displacements in the positions of the plural cameras,
the coordinate transformation parameter obtainment unit is operable to obtain a plurality of the coordinate transformation parameters based on the plural pieces of position displacement information obtained by the position displacement information obtainment unit,
the coordinate transformation unit is operable to perform coordinate transformation on the image coordinates included in the reference image synthesis parameter obtained by the image synthesis parameter obtainment unit, using the plurality of coordinate transformation parameters obtained by the coordinate transformation parameter obtainment unit, and to output the image coordinates as the transformed image synthesis parameter, and
the image synthesis unit is operable to generate the surrounding image by applying the plurality of coordinate transformation parameters to the plurality of captured images, the coordinate transformation parameters being obtained by the coordinate transformation parameter obtainment unit.

11. The surroundings monitoring apparatus according to claim 10,
wherein the reference image synthesis parameter includes, for each pixel of the surrounding image, information which identifies a captured image from among a plurality of the captured images and information of image coordinates indicating a pixel position on the captured image.

12. The surroundings monitoring apparatus according to claim 10,
wherein the coordinate transformation parameter obtainment unit is operable to obtain a coordinate transformation parameter in which a position error of the surrounding image after the coordinate transformation is minimal in a boundary position for a plurality of the captured images, the boundary position being included in the reference image synthesis parameter.

13. The surroundings monitoring apparatus according to claim 1,
wherein the image synthesis parameter obtainment unit is operable to obtain the reference image synthesis parameter which includes information of the image coordinates out of the area of the captured image.

14. The surroundings monitoring apparatus according to claim 1,
wherein the image synthesis parameter obtainment unit is operable to obtain the reference image synthesis parameter which includes plural pieces of information of the image coordinates indicating, per pixel on the surrounding image, positions of two or more pixels which are on the captured image, and
the coordinate transformation unit is operable to select a pixel after performing the coordinate transformation by applying the coordinate transformation parameter obtained by the coordinate transformation parameter obtainment unit to the image coordinates included in the reference image synthesis parameter obtained by the image synthesis parameter obtainment unit, and to output the image coordinates as the transformed image synthesis parameter.

15. The surroundings monitoring apparatus according to claim 1,
wherein the captured image is an image including lens distortion, and
the image synthesis unit is operable to generate the surrounding image using the captured image having a lens distortion parameter in which an error is minimal in the surrounding image generated by one or more of the predetermined reference image synthesis parameters and one or more of the predetermined coordinate transformation parameters.

16. The surroundings monitoring apparatus according to claim 1, further comprising:
a state detection unit operable to detect a state of a moving object including information regarding a location of the moving object which is equipped with the surroundings monitoring apparatus,
wherein the coordinate transformation parameter obtainment unit is operable to obtain the coordinate transformation parameter based on the position displacement information obtained by the position displacement information obtainment unit and a state of the moving object detected by the state detection unit.

17. The surroundings monitoring apparatus according to claim 1, further comprising:
a receiving unit operable to receive a correction degree from a user,
wherein the position displacement information obtainment unit is operable to obtain, as the position displacement information, the correction degree received by the receiving unit.

18. The surroundings monitoring apparatus according to claim 1, further comprising:
a position displacement degree detection unit operable to detect a position displacement degree of the camera,
the position displacement information obtainment unit is operable to obtain, as the position displacement information, the position displacement degree detected by the position displacement degree detection unit.

19. A surroundings monitoring method which generates a surrounding image using an image captured by a camera, the surroundings monitoring method comprising:
a position displacement information obtainment step of obtaining position displacement information which is information regarding a displacement in a position of the camera;
a coordinate transformation parameter obtainment step of obtaining, based on the position displacement information obtained by the position displacement information obtainment step, a coordinate transformation parameter for correcting a distortion in the surrounding image caused by the displacement in the position, the coordinate transformation parameter defining a function for transforming two-dimensional coordinates of one pixel into two-dimensional coordinates of another pixel;
an image synthesis parameter obtainment step of obtaining at least one reference image synthesis parameter which is used for generating the surrounding image using the captured image, the at least one reference image synthesis parameter including information of image coordinates indicating, on the captured image, a pixel position corresponding to each pixel in the surrounding image, and the image coordinates being two-dimensional coordinates;
a coordinate transformation step of performing coordinate transformation on the two-dimensional image coordinates included in the at least one reference image synthesis parameter obtained by the image synthesis parameter obtainment step, using the coordinate transformation parameter obtained by the coordinate transformation parameter obtainment step, and of outputting the image coordinates as a transformed image synthesis parameter indicating transformed two-dimensional image coordinates; and
an image synthesis step of generating the surrounding image by applying the transformed image synthesis parameter to the captured image, and of outputting the generated surrounding image,
wherein the image synthesis step reads, from among pixels included in the captured image, an image of a pixel located in the transformed two-dimensional image coordinates indicated by the transformed image synthesis parameter, and outputs the read image as an image of a pixel located in the surrounding image and corresponding to the pixel located in the transformed two-dimensional image coordinates.

20. A non-transitory computer-readable recording medium storing a program for generating a surrounding image using an image captured by a camera, the program causing a computer to execute steps comprising:
a position displacement information obtainment step of obtaining position displacement information which is information regarding a displacement in a position of the camera;
a coordinate transformation parameter obtainment step of obtaining, based on the position displacement information obtained by the position displacement information obtainment step, a coordinate transformation parameter for correcting a distortion in the surrounding image caused by the displacement in the position, the coordinate transformation parameter defining a function for transforming two-dimensional coordinates of one pixel into two-dimensional coordinates of another pixel;
an image synthesis parameter obtainment step of obtaining at least one reference image synthesis parameter which is used for generating the surrounding image using the captured image, the at least one reference image synthesis parameter including information of image coordinates indicating, on the captured image, a pixel position corresponding to each pixel in the surrounding image, and the image coordinates being two-dimensional coordinates;
a coordinate transformation step of performing coordinate transformation on the two-dimensional image coordinates included in the at least one reference image synthesis parameter obtained by the image synthesis parameter obtainment step, using the coordinate transformation parameter obtained by the coordinate transformation parameter obtainment step, and of outputting the image coordinates as a transformed image synthesis parameter indicating transformed two-dimensional image coordinates; and
an image synthesis step of generating the surrounding image by applying the transformed image synthesis parameter to the captured image, and of outputting the generated surrounding image,
wherein the image synthesis step reads, from among pixels included in the captured image, an image of a pixel located in the transformed two-dimensional image coordinates indicated by the transformed image synthesis parameter, and outputs the read image as an image of a pixel located in the surrounding image and corresponding to the pixel located in the transformed two-dimensional image coordinates.

* * * * *